(12) United States Patent
Pinheiro et al.

(10) Patent No.: US 9,392,531 B2
(45) Date of Patent: Jul. 12, 2016

(54) APPLICATION SPECIFIC CONGESTION CONTROL IN A WIRELESS NETWORK

(71) Applicant: Intel IP Corporation, Santa Clara, CA (US)

(72) Inventors: Ana Lucia A. Pinheiro, Breinigsville, PA (US); Robert Zaus, München (DE); Jerome Parron, Fuerth (DE); Marta Martinez Tarradell, Hillsboro, OR (US); Hyung-Nam Choi, Hamburg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/517,698

(22) Filed: Oct. 17, 2014

(65) Prior Publication Data

US 2015/0215845 A1    Jul. 30, 2015

Related U.S. Application Data

(60) Provisional application No. 61/933,866, filed on Jan. 30, 2014.

(51) Int. Cl.
*H04M 3/00* (2006.01)
*H04W 48/06* (2009.01)
*H04W 88/02* (2009.01)

(52) U.S. Cl.
CPC ............ *H04W 48/06* (2013.01); *H04W 88/02* (2013.01)

(58) Field of Classification Search
CPC .................................... H04W 88/02
USPC ........................................ 455/418
See application file for complete search history.

(56) References Cited

U.S. PATENT DOCUMENTS

| 8,832,777 B2 * | 9/2014 | Raleigh ................ H04W 24/10 455/406 |
| 2009/0086861 A1 * | 4/2009 | Yavuz ................ H04W 52/367 375/346 |

(Continued)

FOREIGN PATENT DOCUMENTS

WO    WO 2013/141600 A1    9/2013

OTHER PUBLICATIONS

International Search Report and Written Opinion for PCT/US2015/013541; May 6, 2015.

(Continued)

*Primary Examiner* — Santiago Garcia

(57) ABSTRACT

Application-specific Congestion control for Data Communication (ACDC) may be implemented by limiting, on a per-application or per-application category basis, access to certain Access Point Names (APNs). For example, during network radio congestion, a mobile device, before allowing an application to initiate a data communication channel, may determine the APN associated with the application and whether the APN is currently a permitted or prohibited APN. In another implementation, ACDC may be implemented by limiting access to certain bearer connections. In some implementations, a combination of APN barring and bearer barring may be used.

24 Claims, 15 Drawing Sheets

(56) References Cited

U.S. PATENT DOCUMENTS

| | | | |
|---|---|---|---|
| 2010/0128694 A1* | 5/2010 | Choi-Grogan | H04W 36/0027 370/331 |
| 2010/0197266 A1* | 8/2010 | Raleigh | G06Q 50/06 455/406 |
| 2011/0171980 A1* | 7/2011 | SJoberg | G06F 17/30867 455/466 |
| 2013/0067449 A1 | 3/2013 | Sannidhanam et al. | |
| 2013/0088956 A1* | 4/2013 | Zhou | H04W 48/02 370/230 |
| 2013/0244634 A1* | 9/2013 | Garrett | G06F 9/4443 455/418 |
| 2013/0301547 A1* | 11/2013 | Gupta | H04W 76/048 370/329 |
| 2013/0344861 A1* | 12/2013 | Brisebois | H04L 41/0893 455/418 |
| 2014/0024358 A1* | 1/2014 | Racha | H04M 1/72577 455/418 |
| 2014/0213238 A1* | 7/2014 | Giraud | G07C 5/008 455/418 |
| 2015/0065133 A1* | 3/2015 | Cui | H04W 36/22 455/436 |
| 2015/0111575 A1* | 4/2015 | Lei | H04W 36/08 455/436 |
| 2015/0208352 A1* | 7/2015 | Backholm | H04W 52/0251 455/574 |

OTHER PUBLICATIONS

3GPP, "Technical Specification Group Services and System Aspects; Study on Application specific congestion control for data communication", Release 13, 3GPP TR 22.806, vol. 0.3.0, Aug. 2013, 17 pages.

3GPP, "Technical Specification Group Core Network and Terminals; Mobile radio interface Layer 3 specification; Core network protocols; Stage 3", Release 12, 3GPP TS 24.008, vol. 12.4.0, Dec. 2013, 691 pages.

3GPP, "Technical Specification Group Core Network and Terminals; Non-Access-Stratum (NAS) Protocol for Evolved Packet System (EPS); Stage 3", Release 12, 3GPP TS 24.301, vol. 12.2.0, Sep. 2013, 352 pages.

3GPP, "Technical Specification Group Services and System Aspects; 3GPP System Architecture Evolution (SAE); Security architecture", Release 12, 3GPP TS 33.401, vol. 12.10.0, Dec. 2013, 121 pages.

3GPP, "Technical Specification Group Radio Access Network; Evolved Universal Terrestrial Radio Access (E-UTRA); Radio Resource Control (RRC); Protocol specification", Release 11, 3GPP TS 36.331, vol. 11.5.0, Sep. 2013, 347 pages.

\* cited by examiner

APPLICATION SPECIFIC CONGESTION CONTROL IN A WIRELESS NETWORK

RELATED APPLICATIONS

The present application claims the benefit of U.S. Provisional Patent Application No. 61/933,866, which was filed on Jan. 30, 2014, and which is hereby incorporated by reference as though fully set forth herein.

BACKGROUND

Wireless mobile communication devices, such as smart phones or other mobile devices, may download and run applications that communicate via a network, such as a cellular network to which the wireless mobile device is connected. Some applications can (intentionally or unintentionally) cause or contribute to network congestion. In the case of a wireless cellular network, the radio access network (RAN) portion of the network may be particularly subject to congestion. Additionally, some applications can cause other issues, such as issues relating to transmission of private information without user consent or the enablement of illegal or other prohibited activities.

One proposal to limit network activity on an application-basis is known as ACDC (Application specific Congestion control for Data Communication), as proposed in Release 13 of the 3rd Generation Partnership Project (3GPP). An objective of ACDC is to provide network operators a mechanism to allow or prohibit with respect to particular applications defined by network operators.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

DETAILED DESCRIPTION OF PREFERRED EMBODIMENTS

Figure 1A:
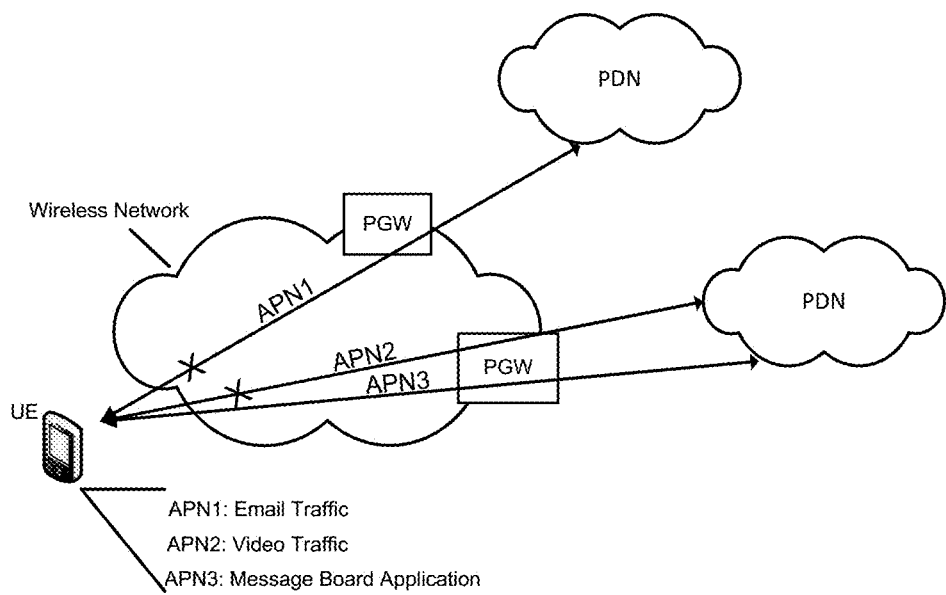
FIG. 1A is a diagram illustrating an example of an overview of concepts described herein, in which network activity is limited based on Access Point Names (APNs)

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein relate to techniques for implementing ACDC in a wireless network, such as cellular network based on the Long-Term Evolution (LTE) standard for wireless communication of data for mobile phones and data terminals. In one implementation, ACDC may be implemented by limiting, on a per-application or per-application category basis, access to certain Access Point Names (APNs). For example, during network radio congestion, a mobile device, before allowing an application to initiate a data communication channel, may determine the APN associated with the application and whether the APN is currently a permitted or prohibited APN. Limiting access to certain APNs, to implement ACDC, will be referred to as "APN barring" herein.

In a second implementation, ACDC may be implemented by limiting access to certain bearer connections, such as, for LTE, certain Evolved Packet System (EPS) bearers that carry specific application traffic. Limiting access to certain bearers, to implement ACDC, will be referred to as "bearer barring" herein. In some implementations, a combination of APN barring and bearer barring may be used.

One implementation described herein may include User Equipment (UE) that comprises: a computer-readable medium to store a mapping between Access Point Names (APNs), associated with a network, and applications associated with the UE; and processing circuitry. The processing circuitry is to: determine a barring status associated with the APNs, the barring status indicating whether communications associated with one or more of the APNs should be barred by the UE; and block a transmission of application requests to the network, from a particular application associated with the UE, when a barring status of the APN associated with the particular application indicates that communications should be barred.

The mappings may be stored as application categories that are associated with APNs. The determination of the barring status may further include receiving the barring status as a probability value or time period.

The processing circuitry may be further to determine whether APN barring has been activated by the network; and wherein blocking the transmission of the application requests is performed only when APN barring has been activated by the network. When determining the barring status associated with the APNs, the processing circuitry may be further to receive, from the network, an enumeration of APNs that have a barring status indicating that communications associated with any of the APNs in the enumeration should be barred by the UE. In some implementations, the enumeration of APNs may be received as part of a System Information Block Type 2 message or a dedicated message.

In some implementations, when determining the barring status associated with the APNs, the processing circuitry may be further to: receive, from the network, an enumeration of APNs that have a barring status indicating that communications associated with any APN that is not in the enumeration should be barred by the UE.

In some implementations, when determining the barring status associated with the APNs, the processing circuitry may be further to: receive, from the network, an indication of the barring status, for a particular APN, in conjunction with establishment of a default or dedicated EPS bearer for the APN. When determining the barring status associated with the APNs, the processing circuitry may be further to: receive, from the network, an indication of the barring status, for a particular APN, as a priority value associated with the particular APN, wherein blocking the transmission of application requests to the network is based on a comparison of the priority associated with the particular APN to a priority value allowed by the network. When determining the barring status associated with the APNs, the processing circuitry may be further to: receive, from the network, an indication of the barring status, for a particular APN, as an enumeration of levels of acceptable congestion for the APN, wherein blocking the transmission of application requests to the network is based on a comparison of the enumeration of the levels of acceptable congestion for the APN with an indication of a current congestion level of the network.

In another possible implementation, a method may include storing, by UE, a mapping between APNs, associated with a network, and applications associated with the UE; determining, by the UE, a barring status associated with the APNs, the barring status indicating whether communications associated with one or more of the APNs should be barred by the UE; and refraining, by the UE, from transmitting requests to the network, from a particular application associated with the UE, when a current barring status of the APN associated with the particular application indicates that communications should be barred.

In another implementation, UE may comprise: a computer-readable medium to store a mapping between EPS bearer connections, associated with a network, and applications associated with the UE; and processing circuitry. The processing circuitry may be to: determine an EPS bearer barring status associated with the EPS bearer connections, the EPS bearer barring status indicating whether communications associated with one or more of the EPS bearer connections should be barred by the UE; receive an indication, from the network, of whether EPS bearer barring should be active; and block communications, requested by a particular application associated with the UE, when an EPS bearer barring status of the EPS bearer connection associated with the particular application indicates that communications should be barred and when EPS bearer barring was indicated as being active for the network.

In one implementation, the EPS bearer connections may be represented by a bearer identity value. In another implementation, determining the EPS bearer barring status may further include receiving the EPS bearer barring status as part of an initial configuration of the EPS bearer connections.

The determination of the EPS bearer barring status may further include receiving the EPS bearer barring status, for a particular EPS bearer connection, as a priority value associated with the particular EPS bearer connection, wherein blocking the communications by the particular application is based on a comparison of the priority associated with the particular EPS bearer to a priority value allowed by the network. The determination of the EPS bearer barring status may further include: receiving the EPS bearer barring status, for a particular EPS bearer connection, as an enumeration of levels of acceptable congestion for the EPS bearer connection, wherein blocking the communications by the particular application is based on a comparison of the enumeration of the levels of acceptable congestion for the EPS bearer connection with an indication of a current congestion level of the network. The determination of the EPS bearer barring status may further include: receiving the EPS bearer barring status as information included in a dedicated network message that is received during initial configuration of an EPS bearer. The determination of the EPS bearer barring status may further include receiving the EPS bearer barring status as a bitmap value in which each bit in the bitmap value corresponds to a particular bearer connection.

In yet another possible implementation, UE may comprise processing circuitry to: receive a request, from an application associated with the UE, to initiate network communications with a PDN; receive an indication, from the network, of whether barring is active for the network; determine, based on a barring status associated with an APN or an EPS bearer connection associated with the application, a barring status associated with the application; block transmission of the request, to initiate the network communications, when the barring status indicates that the application is barred and when the barring is indicated as being active for the network; and transmit the request, to initiate the network communications, when the barring status indicates that the application is not barred or when the barring is not indicated as being active for the network.

In yet another possible implementation, UE may comprise means for storing a mapping between APNs, associated with a network, and applications associated with the UE; means for determining a barring status associated with the APNs, the barring status indicating whether communications associated with one or more of the APNs should be barred by the UE; and means for refraining from transmitting requests to the network, from a particular application associated with the UE, when a current barring status of the APN associated with the particular application indicates that communications should be barred.

In yet another possible implementation, UE may comprise: means for determining an EPS bearer barring status associated with the EPS bearer connections, the EPS bearer barring status indicating whether communications associated with one or more EPS bearer connections should be barred by the UE; means for receive an indication, from the network, of whether EPS bearer barring should be active; and means for blocking communications, requested by a particular application associated with the UE, when an EPS bearer barring status of the EPS bearer connection associated with the particular application indicates that communications should be barred and when EPS bearer barring was indicated as being active for the network.

FIG. 1A is a diagram illustrating an example of an overview of concepts described herein, in which network activity is limited based on APNs (APN barring). As shown, a wireless network may connect user equipment (UE), such as a smart phone or other mobile communication device, to one or more packet data networks (PDNs). PDN gateway (PGWs) may implement interfaces between the wireless network and the PDNs. To implement a communication session with a PDN, the UE may initiate a request, associated with a particular APN, to the wireless network. In response, the wireless network may use the APN to determine the PGW/PDN associated with the request and to determine whether the communication request is allowed for the mobile device.

Consistent with aspects described herein, the UE may associate APNs with different applications and/or application types or categories. The UE may maintain a mapping of the APNs to applications installed at the UE and/or to application categories or types. The associations may be statically defined in the UE or dynamically configured by a network operator. In this example, "APN1" is associated with the application category "email traffic"; "APN2" is associated with the application category "video traffic"; and "APN3" is associated with the specific application "message board application." The "message board application" may be, for example, a public safety application that is installed, by the network operator, on all UEs. In times of natural disasters (e.g., earthquakes, hurricanes, etc.) the message board application may be an application through which users can post their statuses (e.g., "not hurt") for the benefit of friends and family. It may be desirable that traffic relating to the message board application always be given high priority by the network operator, particularly during the occurrence of network congestion and/or natural disasters. In contrast, a particular network operator may decide to give email and video traffic lower priority during periods of congestion or natural disasters.

The UE may prohibit or allow, based on the APN associated with a particular application or application category, the initiation (or continuation) of communication sessions with the PDNs. For example, the UE may maintain a list of APNs that are barred during congestion periods. In response to an indication from the wireless network of congestion, the UE may deny communication sessions associated with the any of the APNs in the list. As another example, the UE may maintain a "whitelist" of APNs that are permitted during periods of congestion. During congestion, the UE may deny communication sessions associated with any APNs that are not in the whitelist. As yet another example, whenever a UE establishes an initial communication session for a given APN, the wireless network may indicate whether communication is permitted for the given APN during periods of congestion. In some implementations, APNs may be associated with priority values or congestion levels. A current network priority value or congestion level may be compared, by the UE, to the APN priority value or congestion level to determine whether to permit communication via the APN.

In the example of FIG. 1A, assume that the occurrence of a congestion event or other event (e.g., natural disaster) is signaled to the UE with an indication that APN barring is to be applied. In response, the UE may determine that APN1 and APN2 are barred and that communication sessions associated with APN3 are permitted. In this example, email traffic and video traffic may thus be blocked (indicated by an "X" in FIG. 1A) and traffic associated with the "message board application" permitted.

Figure 1B:
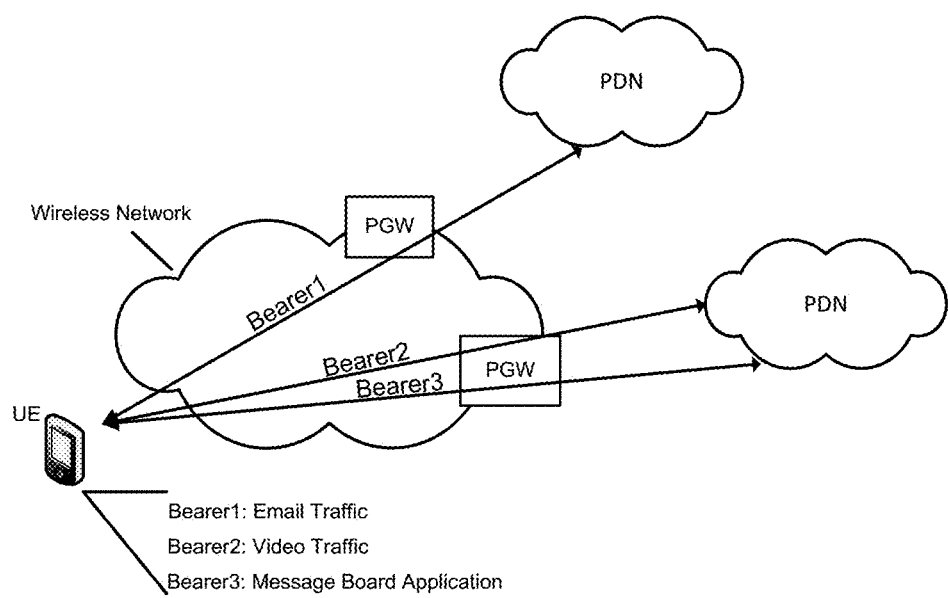
FIG. 1B is a diagram illustrating an example of an overview of concepts described herein, in which ACDC is implemented based on bearers.

FIG. 1B is a diagram illustrating an example of an overview of concepts described herein in which ACDC is implemented via bearer barring. In the example of FIG. 1B, the UE may associate EPS bearers with different applications and/or application types or categories. The UE may maintain a mapping of the EPS bearers to applications. In this example, "Bearer1" is associated with the application category "email traffic"; "Bearer2" is associated with the application category "video traffic"; and "Bearer3" is associated with the specific application "message board application."

During operation, the wireless network may signal the barring status (e.g., bar or allow) of the EPS bearers. For example, the wireless network may indicate that, during periods of congestion, "Bearer1" and "Bearer2" are to be barred and "Bearer3" is to be allowed. During a congestion period, the UE may accordingly bar applications associated with "Bearer1" and "Bearer2" from initiating network communications.

Figure 2:
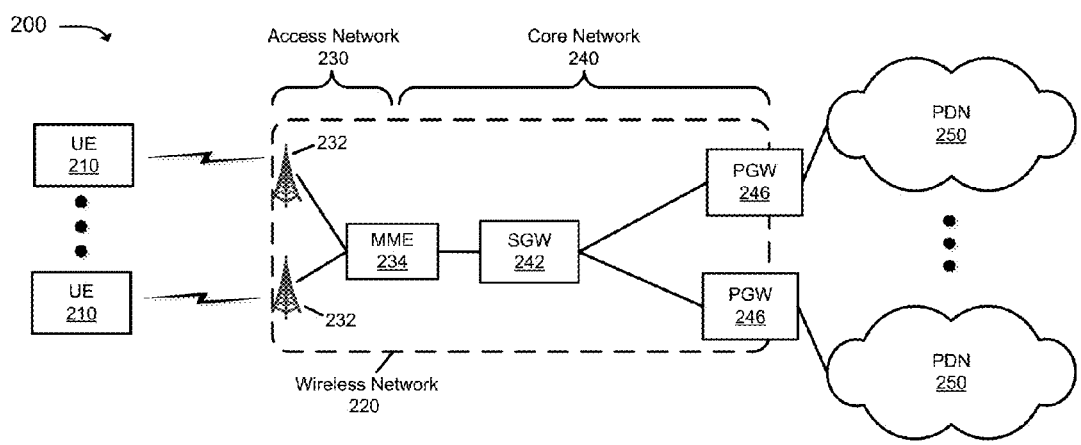
FIG. 2 is a diagram of an example environment in which systems and/or methods described herein may be implemented.

FIG. 2 is a diagram of an example environment 200 in which systems and/or methods described herein may be implemented. As illustrated, environment 200 may include one or more UEs 210 (referred to singularly as UE 210 or collectively as UEs 210), which may obtain network connectivity through, for example, wireless network 220. Wireless network 220 may provide access to one or more external networks, each labeled as packet data network (PDN) 250. The wireless network may include access network 230 and core network 240. Access network 230 may, in some implementations, be associated with a network operator that controls or otherwise manages core network 240. Core network 240 may include an Internet Protocol (IP)-based network, such as System Architecture Evolution (SAE) core network or a General Packet Radio Service (GPRS) core network.

UE 210 may include a portable computing and communication device, such as a personal digital assistant (PDA), a smart phone, a cellular phone, a laptop computer with connectivity to a cellular wireless network, a tablet computer, etc. UE 210 may also include non-portable computing devices, such as desktop computers, consumer or business appliances, or other devices that have the ability to wirelessly connect to access network 230.

Access network 230 may represent a 3GPP access network that includes one or more access technologies. Access network 230 may include base stations 232 and mobility management entity (MME) 234. In the context of an LTE-based access network, base stations 232 may each be referred to as an evolved NodeB (eNodeB) 232. Core network 240 may include an IP-based network. In the 3GPP network architecture, core network 240 may include an Evolved Packet Core (EPC). As illustrated, core network 240 may include serving gateway (SGW) 242 and packet data network gateways (PGW) 246. Although certain network devices are illustrated in environment 200 as being part of access network 230 and core network 240, whether a network device is labeled as being in the "access network" or the "core network" of environment 200 may be an arbitrary decision that may not affect the operation of wireless network 220.

ENodeBs 232 may each provide a radio interface over which the eNodeB may communicate with UEs 210. The radio interface may include a radio interface that implements, for example, an evolved UMTS (Universal Mobile Telecommunications System) Terrestrial Radio Access (E-UTRA) network.

MME 234 may include one or more computation and communication devices that perform operations to register UEs 210 with core network 240, establish bearer channels associated with a session with UEs 210, hand off UEs 210 from one eNodeB to another, and/or perform other operations. MME 234 may generally handle control plane traffic. SGW 242 may include one or more network devices that aggregate traffic received from one or more eNodeBs 232. SGW 242 may generally handle user (data) plane traffic.

PGW 246 may include one or more devices that act as the point of interconnect between core network 240 and external IP networks, such as PDNs 250, and/or operator IP services. PGW 246 may route packets to and from the access networks and the external IP networks.

PDNs 250 may each include packet-based networks. PDNs 250 may include external networks, such as a public network (e.g., the Internet) or proprietary networks that provide services that are provided by the operator of core network 240 (e.g., IP multimedia (IMS)-based services, transparent end-to-end packet-switched streaming services (PSSs), or other services).

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200.

As previously mentioned, in one implementation, APN barring may be used to implement ACDC by limiting, on a per-application or per-application category basis, access to certain APNs.

An APN may provide a logical identification of a PDN and/or PGW that UE 210 is to communicate with to obtain network services. UE 210, when making a data connection, may be configured with an APN to present to wireless network 220. Wireless network 220 may examine the APN to determine what type of network connection should be created, for example: what IP addresses should be assigned to UE 210, what security methods should be used, and how or if, UE 210 should be connected to a customer network. In addition to identifying a PDN, an APN may also be used to define the type of service, (e.g. connection to wireless application protocol (WAP) server, multimedia messaging service (MMS)) that is provided by the PDN).

As defined in the 3GPP TS 24.008 specification, section 10.5.6.1, an APN may be a label or a fully qualified domain name according to the Domain Name System (DNS) naming conventions. An APN label may have a minimum length of three octets and a maximum length of 102 octets. As an example of the use of an APN, UE 210, when attaching to wireless network 220, may initially connect to one of PDNs 250 based on the default APN that is configured for UE 210. Different applications and/or application types, that are executed by UE 210, may be associated with different APNs.

Figure 3A:
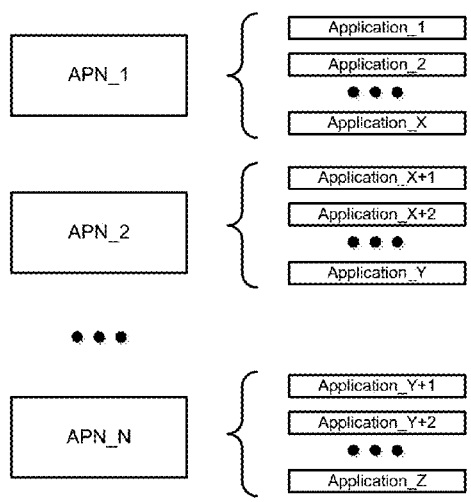
FIGS. 3A-3C are diagrams illustrating the mapping of applications and/or application categories with APNs.
Figure 3B:
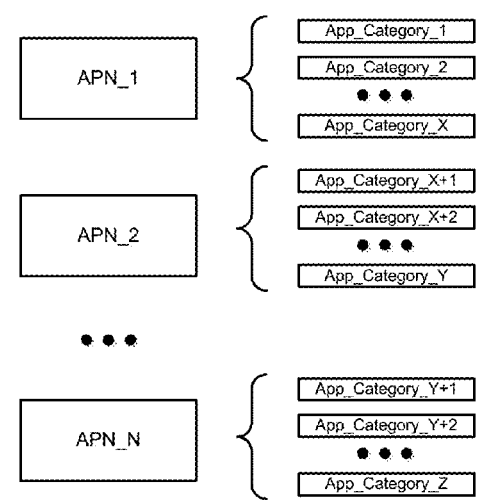
Figure 3C:
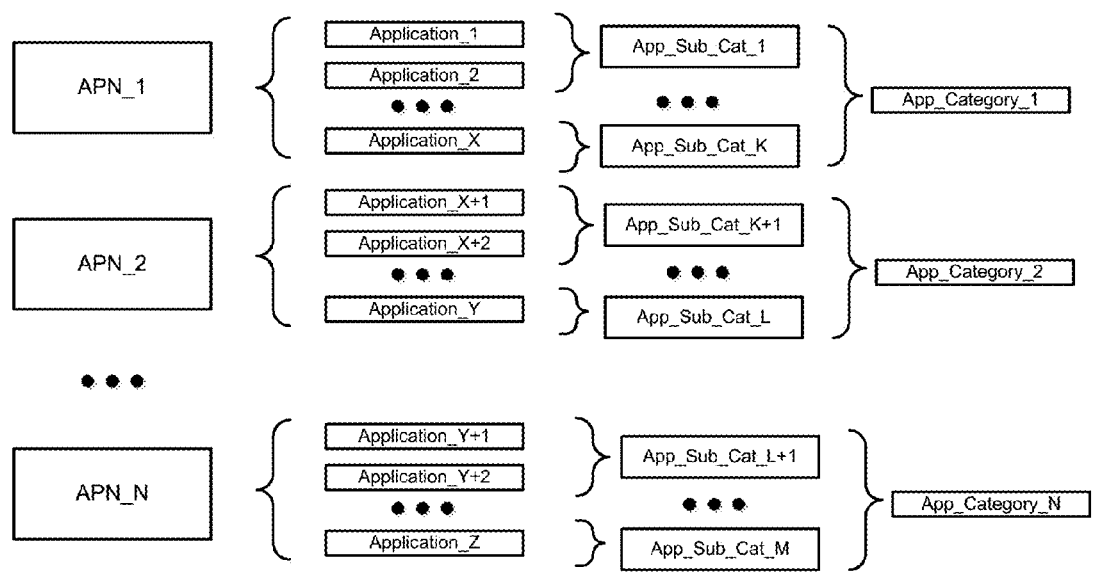

FIGS. 3A-3C are diagrams illustrating the mapping of applications and/or application categories with APNs. The mappings shown in FIGS. 3A-3C may be performed at the UE application level, which may allow for the UE NAS (non-access stratum) and AS (access stratum) functional protocol layers to be application unaware, since the mapping at the application level may be transparent to the UE NAS and AS layers. The mappings shown in FIGS. 3A-3C may be stored by UEs 210, such as via static storage that is configured during manufacture or provisioning of UEs 210, or may be dynamically received, such as through over the air (OTA) techniques, from wireless network 220. The mappings shown in FIGS. 3A-3C may be stored by UEs 210 using one or more data structures.

As illustrated in FIG. 3A, applications may be associated with (e.g., mapped to) particular APNs. An application, in this context, may refer to a particular application, such as an application published by a particular developer or other entity and that is installed by a user of UE 210, and/or an application that is installed during manufacture or provisioning of UE 210. Each application may be uniquely identified, such as by a value assigned to the application (e.g., a value generated by a hash of the application's code), a title of the application, or by another value. In FIG. 3A, each of a number of APNs, labeled as APN_1 through APN_N, are illustrated as being associated with applications. In particular, APN_1 is associated with the applications labeled as Application_1 through Application_X; APN_2 is associated with the applications labeled as Application_X+1 through Application_Y; and APN_N is associated with the applications labeled as Application_Y+1 through Application_Z. The variables N, X, Y, and Z may represent positive integers.

As illustrated in FIG. 3B, in some implementations, applications may be mapped, based on corresponding application categories, with particular APNs. An application category may represent the type of an application based on the functionality of the application (e.g., email, video conferencing, gaming, etc.) or the type of the network traffic used by the application (e.g., a priority or guaranteed bandwidth used by bearer connections associated with applications). With the associations shown in FIG. 3B, different applications may be associated with particular APNs based on the application category corresponding to the different applications. For instance, APN_1 is associated with the application categories labeled as App_Category_1 through App_Category_X; APN_2 is associated with the application categories labeled as App_Category_X+1 through App_Category_Y; and APN_N is associated with the application categories labeled as App_Category_Y+1 through App_Category_Z.

As illustrated in FIG. 3C, in one implementation, applications may be mapped to APNs based on a hierarchical association that includes application categories (or sub-categories) and specific applications. In this implementation, UE 210 may include associations of both specific applications to APNs (e.g., as illustrated in FIG. 3A) and associations of application categories to APNs (e.g., as illustrated in FIG. 3B). The application categories may be further divided into sub-categories. For example, a "video traffic" category may include the sub-categories "streaming media video" and "two-way teleconferencing video." Applications may be assigned to categories based on the first matching one of: specific application identifier, application-sub category, and application category. In other words, if a particular application is specifically indicated as corresponding to an APN, the particular application may be associated with the APN. If the particular application is not specifically indicated as corresponding to any APN, but the particular application is associated with a sub-category, the particular application may be associated with the APN based on the sub-category. Otherwise, the particular application may be associated with the APN based on the category.

As illustrated in FIG. 3C, APNs 1 through N are associated with applications Application_1 through Application_Z. Application sub-categories (App_Sub_Cat_1 through App_Sub_Cat_K, App_Sub_Cat_K+1 through App_Sub_Cat_L, and App_Sub_Cat_L+1 through App_Sub_Cat_M) and categories (App_Category_1, App_Category_2, and App_Category_N) are also associated with the APNs. For instance, as shown, the first application category (App_Category_1) may be associated with the sub-categories App_Sub_Cat_1 through App_Sub_Cat_K. App_Sub_Cat_1 may include the applications Application_1 and Application_2. App_Sub_Cat_K may include the application Application_X. App_Category_1, App_Sub_Cat_1 through App_Sub_Cat_K, and Application_1 through Application_X may all map to the APN labeled as APN_1.

Figure 4:
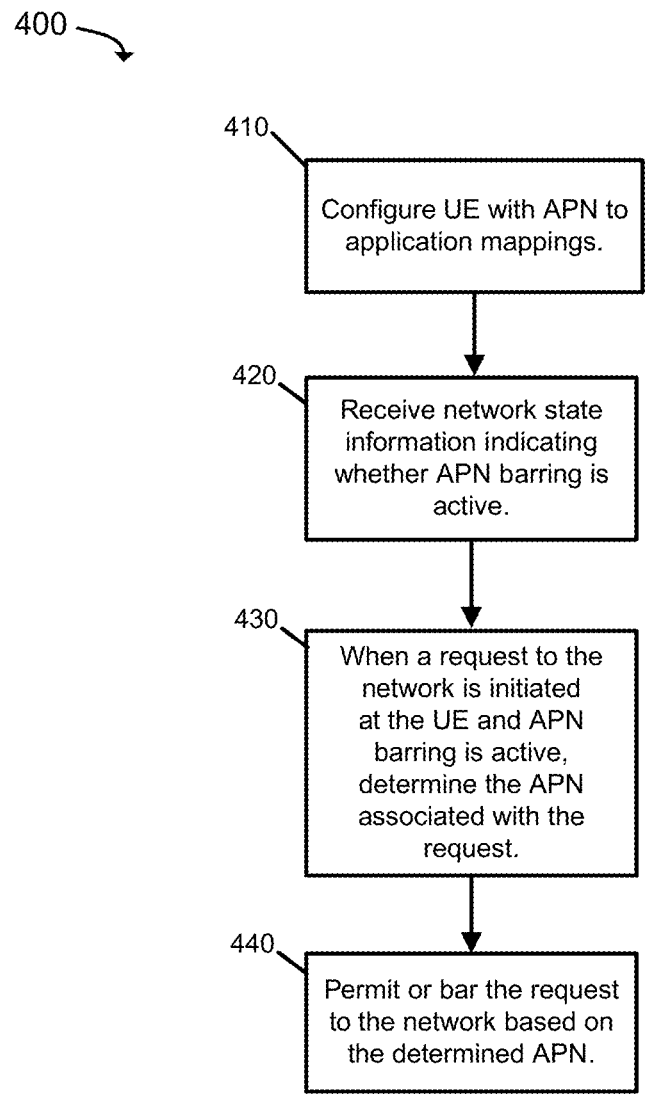
FIG. 4 is a flowchart illustrating an example of a process relating to APN barring.

FIG. 4 is a flowchart illustrating an example of a process 400 relating to APN barring. Process 400 may be performed by, for example, UE 210.

Process 400 may include configuring the UE with APN to application mappings (block 410). The APN to application mappings may be stored by UE 210 as one or more data structures, such as those illustrated with respect to FIGS. 3A-3C. UE 210 may obtain the mappings during manufacture or provisioning of UE 210 and/or the mappings may be dynamically received or updated, such as through OTA techniques.

Process 400 may further include receiving network state information indicating whether APN barring is active (block 420). In one implementation, network 220, such as MME 234 or SGW 242 of network 220, may explicitly indicate, such as via a System Information Block message, or another message type, when APN barring is to be active. In some implementations, APN barring may be made active based on the satisfaction of another condition. For example, UE 210 may receive an indication that APN barring is to be activated whenever network 220 is congested, such as whenever eNodeB 232 indicates, to UE 210, the radio access network is in a congestion state.

In some implementations, the barring status relating to whether APN barring is active, instead of being received as a Boolean value indicating whether APN barring is active or not active, may be received as another value, such as a probability of performing APN barring or a time period over which APN barring is to be active. With respect to receiving the APN barring status as a probability, UE 210 may generate a random number and compare the random number to the received probability value to indicate whether APN barring is to be active for the specific UE.

Process 400 may further include, when a request to the network is initiated at the UE when APN barring is active, determining the APN associated with the request (block 430). A request to the network may refer to a data connection or session that is requested by an application executing at UE 210. Alternatively or additionally, in some implementations, in response to a determination that APN barring is to be set to active, ongoing network sessions may be subject to APN barring restrictions. The APN may be determined by the application to APN mappings (or the application category/sub-category mappings) with which UE 210 is configured (e.g., as illustrated in FIGS. 3A-3C).

Process 400 may further include permitting or barring the request to the network based on the determined APN (block 440). For example, in one implementation, during periods of network congestion, only certain APNs may be permitted. Application requests, to the network, associated with other APNs may be barred (i.e., UE 210 may refrain from transmitting a request to wireless network 220). By refraining from transmitting the request to the network, network load may not affected by requests generated at the application layer of UE 210. Advantageously, process 400 may generally operate to reduce power consumption of UE 210, optimize network usage, and/or maximize cell capacity of wireless network 220 (when wireless network 220 includes a cellular radio access network).

Consistent with aspects described herein, a number of techniques may be used to perform blocks 430 and 440 of process 400. These techniques will be discussed in more detail below with reference to FIGS. 5-9.

Figure 5:
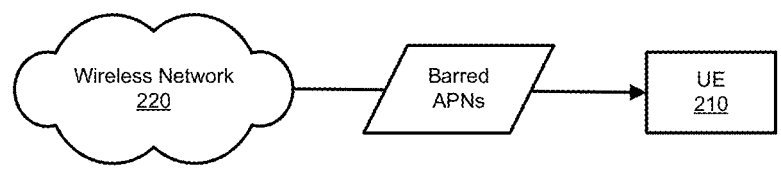
FIGS. 5-9 are diagrams conceptually illustrating APN barring using different techniques described herein.

FIG. 5 is a diagram conceptually illustrating APN barring using an enumeration of barred APNs. As illustrated in FIG. 5, wireless network 220 may transmit a list (or other data structure) of barred APNs to UE 210. The list of barred APNs may be transmitted, for example, by eNodeB 232, MME 234, or another network device. The list of APNs to be barred during congestion maybe be pre-configured in the UE. The list of barred APNs may define APNs for which UE 210 will not establish a new PDN connection or initiate any communication via an existing PDN connection.

In one implementation, the list of barred APNs may be broadcast to UEs 210 in response to the occurrence of congestion. The list of barred APNs may be broadcast as a list that includes a fully qualified domain name (potentially including a delimiter between APNs) of each APN. Alternatively, to potentially reduce the size of the list of barred APNs, only a portion, such as a prefix portion, may be transmitted for each APN. For example, for an APN corresponding to an IMS PDN connection, the complete APN may be of the form "IMS.operatorname.x.y". For this APN, the "IMS" portion of the APN may be the distinguishing portion of the APN name and "operatorname.x.y" may be omitted in the transmitted list of barred APNs. UE 210 may reconstruct the full APN from the received portion of the APN.

In another possible implementation, instead of broadcasting the list of barred APNs in response to the occurrence of congestion, the list of barred APNs may be transmitted to UE 210 ahead of time, such as by UE 210 downloading the list of barred APNs via OTA or OMA-DA updates. Wireless network 220 may notify UE whenever APN barring is to be activated (e.g., when there is congestion). UE 210 may then proceed to bar access to all APNs in the previously received list of barred APNs. In one implementation, the indication that APN barring is to be activated may be transmitted to UE 210 as part of a System Information Block Type 2 message, as defined in the technical specification 3GPP TS 36.331. For example, a "Congestion Indication Field," having a Boolean value, may be added to this message.

UE 210, when receiving the list of barred APNs, may save the list of barred APNs as the most current list of barred APNs. If APN barring is subsequently activated, such as during a period of congestion, the list of barred APNs may be used by UE 210 to bar any requests to the network that are associated with applications that map to an APN in the barred list of APNs.

In one implementation, UE 210 may be pre-configured with APNs, relevant for the public land mobile network (PLMN), that are associated with UE 210, where each of the APNs may be associated with an index value. The indexes for the APNs may be, for example, initially set in UE 210 (e.g., during provisioning) and updated via OTA updates, OMA-DM (Open Mobile Alliance-Device Management) updates, updates included in NAS messages, or updates that are sent via SMS (Short Message Service) push messages. In this situation, the list of barred APNs may be transmitted as a list of the indexes or a bitmap referring to the indexes.

In one implementation, the list of barred APNs (e.g., either a complete list of barred APNs or a list of APN indexes) may be transmitted to UE 210 as part of a System Information Block Type 2 message. For example, an "APN-Barring-Status" field may be added to this message. The APN-Barring-Status field may be a bitmap in which each bit corresponds to an indexed APNs. For instance, a logic one bit value for a bit may indicate that the corresponding APN is barred during congestion and a logic zero bit value may indicate that the corresponding APN is not barred during congestion.

One possible implementation of a System Information Block Type 2 message, including an "APN-Barring-Status" field, is illustrated in Table I. Table II includes field descriptions for the fields in Table I. In Tables I and II, bold text indicates text that may be added to the 3GPP TS 36.331 standard to implement the "APN-Barring-Status" field.

TABLE I

SystemInformationBlockType2 information element, 3GPP TS 36.331

```
-- ASN1START
SystemInformationBlockType2 ::=     SEQUENCE {
    ac-BarringInfo                  SEQUENCE {
        ac-BarringForEmergency          BOOLEAN,
        ac-BarringForMO-Signalling      AC-BarringConfig        OPTIONAL,  -- Need OP
        ac-BarringForMO-Data            AC-BarringConfig        OPTIONAL   -- Need OP
    }                                                           OPTIONAL,  -- Need OP
```

TABLE I-continued

SystemInformationBlockType2 information element, 3GPP TS 36.331

```
        radioResourceConfigCommon         RadioResourceConfigCommonSIB,
        ue-TimersAndConstants             UE-TimersAndConstants,
        freqInfo                          SEQUENCE {
            ul-CarrierFreq                    ARFCN-ValueEUTRA              OPTIONAL,  -- Need OP
            ul-Bandwidth                      ENUMERATED {n6, n15, n25, n50, n75, n100}
                                                                            OPTIONAL,  -- Need OP
            additionalSpectrumEmission        AdditionalSpectrumEmission
        },
        mbsfn-SubframeConfigList          MBSFN-SubframeConfigList           OPTIONAL,  -- Need OR
        timeAlignmentTimerCommon          TimeAlignmentTimer,
        ...,
        lateNonCriticalExtension          OCTET STRING (CONTAINING SystemInformationBlockType2-v8h0-IEs)
                        OPTIONAL,      -- Need OP
        [[  ssac-BarringForMMTEL-Voice-r9      AC-BarringConfig              OPTIONAL,  -- Need OP
            ssac-BarringForMMTEL-Video-r9      AC-BarringConfig              OPTIONAL   -- Need OP
        ]],
        [[  ac-BarringForCSFB-r10              AC-BarringConfig              OPTIONAL   -- Need OP
        ]]
}
SystemInformationBlockType2-v8h0-IEs ::=     SEQUENCE {
    multiBandInfoList                 SEQUENCE (SIZE (1..maxMultiBands)) OF AdditionalSpectrumEmission
        OPTIONAL,  -- Need OR
    nonCriticalExtension              SystemInformationBlockType-v9e0-IEs      OPTIONAL    -- Need OP
}
SystemInformationBlockType2-v9e0-IEs :: = SEQUENCE {
    ul-CarrierFreq-v9e0               ARFCN-ValueEUTRA-v9e0         OPTIONAL,  -- Cond ul-FreqMax
    nonCriticalExtension              SEQUENCE { }                  OPTIONAL   -- Need OP
}
AC-BarringConfig :: =                 SEQUENCE {
    ac-BarringFactor                      ENUMERATED {
                                              p00, p05, p10, p15, p20, p25, p30, p40,
                                              p50, p60, p70, p75, p80, p85, p90, p95},
    ac-BarringTime                        ENUMERATED {s4 , s8 , s16, s32 , s64, s128, s256, s512},
    ac-BarringForSpecialAC                BIT STRING (SIZE(5))
}
MBSFN-SubframeConfigList ::=          SEQUENCE (SIZE (1..maxMBSFN-Allocations)) OF MBSFN-SubframeConfig
SystemInformationBlockType2-v13xx-IEs ::= SEQUENCE {
Apn-BarringStatus BIT STRING (SIZE (maxAPN)) OPTIONAL-- Need OP
nonCriticalExtension SEQUENCE { } OPTIONAL-- Need OP
}
```

TABLE II

SystemInformationBlockType2 Field Descriptions ac-BarringFactor
If the random number drawn by the UE is lower than this value, access is allowed. Otherwise the access is barred. The values are interpreted in the range [0, 1): p00 = 0, p05 = 0.05, p10 = 0.10, . . . , p95 = 0.95. Values other than p00 can only be set if all bits of the corresponding ac-BarringForSpecialAC are set to 0.
ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for AC 12, and so on.
ac-BarringTime
Mean access barring time value in seconds.
additionalSpectrumEmission
The UE requirements related to IE AdditionalSpectrumEmission are defined in TS 36.101 [42, table 6.2.4.1].
mbsfn-SubframeConfigList
Defines the subframes that are reserved for MBSFN in downlink.
multiBandInfoList
A list of additionalSpectrumEmission i.e. one for each additional frequency band included in multiBandInfoList in SystemInformationBlockType1, listed in the same order.
ssac-BarringForMMTEL-Video
Service specific access class barring for MMTEL video originating calls.
ssac-BarringForMMTEL-Voice
Service specific access class barring for MMTEL voice originating calls.

TABLE II-continued

SystemInformationBlockType2 Field Descriptions ul-Bandwidth
Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth.
ul-CarrierFreq
For FDD: If absent, the (default) value determined from the default TX-RX frequency separation defined in TS 36.101 [42, table 5.7.3-1] applies.
For TDD: This parameter is absent and it is equal to the downlink frequency.
Apn-BarringStatus
Barring status for each APN. The first/leftmost bit is for the first APN, the second bit is for the second APN, and so on. 1 means that the APN is barred during congestion and 0 means the APN is not barred during congestion.

One possible implementation of a System Information Block Type 2 message, including an indication of congestion, is illustrated in Table III. Table IV includes field descriptions for the fields in Table III. In Tables III and IV, bold text indicates text that may be added to the 3GPP TS 36.331 standard to implement the indication of congestion.

TABLE III

SystemInformationBlockType2 information element, 3GPP TS 36.331

```
-- ASN1START
SystemInformationBlockType2 ::=     SEQUENCE {
    ac-BarringInfo                      SEQUENCE {
        ac-BarringForEmergency              BOOLEAN,
        ac-BarringForMO-Signalling          AC-BarringConfig              OPTIONAL,  -- Need OP
        ac-BarringForMO-Data                AC-BarringConfig              OPTIONAL   -- Need OP
    }                                                                     OPTIONAL,  -- Need OP
    radioResourceConfigCommon           RadioResourceConfigCommonSIB,
    ue-TimersAndConstants               UE-TimersAndConstants,
    freqInfo                            SEQUENCE {
        ul-CarrierFreq                      ARFCN-ValueEUTRA              OPTIONAL,  -- Need OP
        ul-Bandwidth                        ENUMERATED {n6, n15, n25, n50, n75, n100}
                                                                          OPTIONAL,  -- Need OP
        additionalSpectrumEmission          AdditionalSpectrumEmission
    },
    mbsfn-SubframeConfigList            MBSFN-SubframeConfigList          OPTIONAL,  -- Need OR
    timeAlignmentTimerCommon            TimeAlignmentTimer,
    ...,
    lateNonCriticalExtension            OCTET STRING (CONTAINING SystemInformationBlockType2-v8h0-IEs)
                            OPTIONAL,   -- Need OP
    [[  ssac-BarringForMMTEL-Voice-r9      AC-BarringConfig               OPTIONAL,  -- Need OP
        ssac-BarringForMMTEL-Video-r9      AC-BarringConfig               OPTIONAL   -- Need OP
    ]],
    [[  ac-BarringForCSFB-r10              AC-BarringConfig               OPTIONAL   -- Need OP
    ]]
}
SystemInformationBlockType2-v8h0-IEs ::=    SEQUENCE {
    multiBandInfoList                   SEQUENCE (SIZE (1..maxMultiBands)) OF AdditionalSpectrumEmission
        OPTIONAL,   -- Need OR
    nonCriticalExtension                SystemInformationBlockType2-v9e0-IEs        OPTIONAL   -- Need OP
}
SystemInformationBlockType2-v9e0-IEs ::= SEQUENCE {
    ul-CarrierFreq-v9e0                 ARFCN-ValueEUTRA-v9e0             OPTIONAL   -- Cond ul-FreqMax
    nonCriticalExtension                SystemInformationBlockType2-v13xx-IEs       OPTIONAL   -- Need OP
}
SystemInformationBlockType2-v12xx-IEs ::= SEQUENCE {
Congestion-indication BOOLEAN OPTIONAL, -- Need OP
nonCriticalExtension SEQUENCE { } OPTIONAL -- Need OP
}
AC-BarringConfig ::=                SEQUENCE {
    ac-BarringFactor                    ENUMERATED {
                                            p00, p05, p10, p15, p20, p25, p30, p40,
                                            p50, p60, p70, p75, p80, p85, p90, p95},
    ac-BarringTime                      ENUMERATED {s4, s8, s16, s32, s64, s128, s256, s512},
    ac-BarringForSpecialAC              BIT STRING (SIZE(5))
}
MBSFN-SubframeConfigList ::=        SEQUENCE (SIZE (1..maxMBSFN-Allocations)) OF MBSFN-SubframeConfig
```

TABLE IV

SystemInformationBlockType2 Field Descriptions ac-BarringFactor
If the random number drawn by the UE is lower than this value, access is allowed. Otherwise the access is barred.
The values are interpreted in the range [0, 1): p00 = 0, p05 = 0.05, p10 = 0.10, . . . , p95 = 0.95. Values other than
p00 can only be set if all bits of the corresponding ac-BarringForSpecialAC are set to 0.
ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for AC 12, and so on.
Congestion-indication
Indication of congestion in the cell. Value TRUE indicates that there is congestion in the cell. Value TRUE
may trigger the barring of access to some APNs.
ac-BarringTime
Mean access barring time value in seconds.
additionalSpectrumEmission
The UE requirements related to IE AdditionalSpectrumEmission are defined in TS 36.101 [42, table 6.2.4.1].
mbsfn-SubframeConfigList
Defines the subframes that are reserved for MBSFN in downlink.
multiBandInfoList
A list of additionalSpectrumEmission i.e. one for each additional frequency band included in multiBandInfoList in
SystemInformationBlockType1, listed in the same order.
ssac-BarringForMMTEL-Video
Service specific access class barring for MMTEL video originating calls.
ssac-BarringForMMTEL-Voice
Service specific access class barring for MMTEL voice originating calls.
ul-Bandwidth
Parameter: transmission bandwidth configuration, $N_{RB}$, in uplink, see TS 36.101 [42, table 5.6-1]. Value n6
corresponds to 6 resource blocks, n15 to 15 resource blocks and so on. If for FDD this parameter is absent, the
uplink bandwidth is equal to the downlink bandwidth. For TDD this parameter is absent and it is equal to the
downlink bandwidth.
ul-CarrierFreq
For FDD: If absent, the (default) value determined from the default TX-RX frequency separation defined in TS
36.101 [42, table 5.7.3-1] applies.
For TDD: This parameter is absent and it is equal to the downlink frequency.

Figure 6:
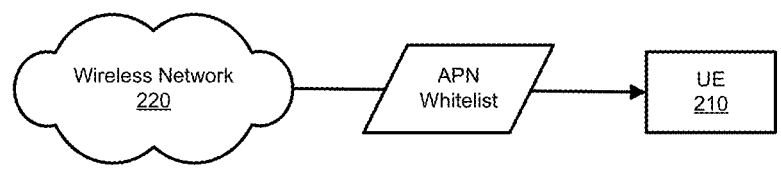

FIG. 6 is a diagram conceptually illustrating APN barring using an APN whitelist. As illustrated in FIG. 6, wireless network 220 may transmit a whitelist of APNs to UE 210. The whitelist of APNs may define APNs that will be allowed by UE 210. In other words, APNs not on the whitelist may be APNs for which UE 210 may bar the establishment of a new PDN connection and/or bar the initiation of communications via an existing PDN connection. In general, implementing APN barring using a whitelist of APNs may be implemented similarly to APN barring using the list of barred APNs, as discussed with respect to FIG. 5, except that the barred APNs may include any APNs that are not explicitly in the APN whitelist.

In one implementation, the whitelist of APNs may be broadcast to UEs 210 in response to the occurrence of congestion. As with the list of barred APNs, the whitelist of APNs may be broadcast as a list that includes a fully qualified domain name of each APN. Alternatively, to potentially reduce the size of the whitelist of APNs, only a portion, such as a prefix portion or a corresponding index value, may be transmitted for each APN.

In another possible implementation, instead of broadcasting the whitelist of APNs in response to the occurrence of congestion, the whitelist of APNs may be transmitted to UE 210 ahead of time, such as by UE 210 downloading the list of barred APNs via OTA or OMA-DM updates. Wireless network 220 (e.g., via corresponding UE 232) may notify UE whenever APN barring is to be activated (e.g., when there is congestion). The notification may be included as, for example, a field in a System Information Block Type 2 message. In another possible implementation, instead of sending the whitelist of APNs, the whitelist of APNs may be pre-configured in UE 210 during provisioning. The whitelist can then potentially be modified via OTA (Over The Air) or OMA-DM (Open Mobile Alliance-Device Management) updates.

In one implementation, UE 210 may be pre-configured with a list of indexed APNs relevant for the PLMN that is associated with UE 210. The list of indexed APNs may be, for example, initially set in UE 210 (e.g., during provisioning) and updated via OTA updates, OMA-DM (Open Mobile Alliance Device Management) updates, updates included in NAS messages, or updates that are sent via SMS (Short Message Service) push messages. In this situation, the whitelist of APNs may include a list of indexes or a bitmap referring to the indexes in the list of indexed APNs. The whitelist of APNs may be transmitted to UE 210 as part of the System Information Block Type 2 message. For example, an "APN-Whitelist-Status" field may be added to this message. The APN-Whitelist-Status field may be a bitmap that includes a bit corresponding to each APN in the list of indexed APNs. A logic one bit value for a bit may indicate that the corresponding APN is on the whitelist and a logic zero bit value may indicate that the corresponding APN is not on the whitelist.

Tables V-VIII illustrate examples of System Information Block Type 2 messages that may be used to implement an example implementation of APN barring using APN whitelists. Table V illustrates an example System Information Block Type 2 message that includes a bitmap field indicating which APNs are allowed, Table VI illustrates field descriptions for the fields in Table V, Table VI illustrates an example System Information Block Type 2 message that includes an indication of APN barring (i.e., indication of congestion), and table VII illustrates field descriptions for the fields in Table VI. In Tables V-VIII, bold text indicates text that may be added to the 3GPP TS 36.331 standard to implement the indication of congestion.

TABLE V

SystemInformationBlockType2 information element, 3GPP TS 36.331

```
-- ASN1START
SystemInformationBlockType2 ::=         SEQUENCE {
    ac-BarringInfo                          SEQUENCE {
        ac-BarringForEmergency                  BOOLEAN,
        ac-BarringForMO-Signalling              AC-BarringConfig        OPTIONAL,  -- Need OP
        ac-BarringForMO-Data                    AC-BarringConfig        OPTIONAL,  -- Need OP
    }                                                                   OPTIONAL,  -- Need OP
    radioResourceConfigCommon               RadioResourceConfigCommonSIB,
    ue-TimersAndConstants                   UE-TimersAndConstants,
    freqInfo                                SEQUENCE {
        ul-CarrierFreq                          ARFCN-ValueEUTRA        OPTIONAL,  -- Need OP
        ul-Bandwidth                            ENUMERATED {n6, n15, n25, n50, n75, n100}
                                                                        OPTIONAL,  -- Need OP
        additionalSpectrumEmission              AdditionalSpectrumEmission
    },
    mbsfn-SubframeConfigList                MBSFN-SubframeConfigList    OPTIONAL,  -- Need OR
    timeAlignmentTimerCommon                TimeAlignmentTimer,
    ...,
    lateNonCriticalExtension                OCTET STRING (CONTAINING SystemInformationBlockType2-v8h0-IEs)
                                                                        OPTIONAL,  -- Need OP
    [[  ssac-BarringForMMTEL-Voice-r9           AC-BarringConfig        OPTIONAL,  -- Need OP
        ssac-BarringForMMTEL-Video-r9           AC-BarringConfig        OPTIONAL   -- Need OP
    ]],
    [[  ac-BarringForCSFB-r10                   AC-BarringConfig        OPTIONAL   -- Need OP
    ]]
}
SystemInformationBlockType2-v8h0-IEs ::=    SEQUENCE {
    multiBandInfoList                       SEQUENCE (SIZE (1..maxMultiBands)) OF AdditionalSpectrumEmission
                                                                        OPTIONAL,  -- Need OR
    nonCriticalExtension                    SystemInformationBlockType2-v9e0-IEs    OPTIONAL   -- Need OP
}
SystemInformationBlockType2-v9e0-IEs ::= SEQUENCE {
    ul-CarrierFreq-v9e0                     ARFCN-ValueEUTRA-v9e0       OPTIONAL   -- Cond ul-FreqMax
    nonCriticalExtension                    SystemInformationBlockType2-v13xx-IEs   OPTIONAL   -- Need OP
}
AC-BarringConfig ::=                    SEQUENCE {
    ac-BarringFactor                        ENUMERATED {
                                                p00, p05, p10, p15, p20, p25, p30, p40,
                                                p50, p60, p70, p75, p80, p85, p90, p95},
    ac-BarringTime                          ENUMERATED (s4, s8, s16, s32, s64, s128, s256, s512},
    ac-BarringForSpecialAC                  BIT STRING (SIZE(5))
}
MBSFN-SubframeConfigList ::=            SEQUENCE (SIZE (1..maxMBSFN-Allocations)) OF MBSFN-SubframeConfig
SystemInformationBlockType2-v13xx-IEs ::= SEQUENCE {
Apn-WhiteList BIT STRING (SIZE (maxAPN)) OPTIONAL-- Need OP
nonCriticalExtension SEQUENCE { } OPTIONAL-- Need OP
}
--ASN1STOP
```

TABLE VI

SystemInformationBlockType2 Field Descriptions ac-BarringFactor
If the random number drawn by the UE is lower than this value, access is allowed. Otherwise the access is barred. The values are interpreted in the range [0, 1): p00 = 0, p05 = 0.05, p10 = 0.10, . . . , p95 = 0.95. Values other than p00 can only be set if all bits of the corresponding ac-BarringForSpecialAC are set to 0.

TABLE VI-continued

SystemInformationBlockType2 Field Descriptions ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for AC 12, and so on.
ac-BarringTime
Mean access barring time value in seconds.
additionalSpectrumEmission
The UE requirements related to IE AdditionalSpectrumEmission are defined in TS 36.101 [42, table 6.2.4.1].
mbsfn-SubframeConfigList
Defines the subframes that are reserved for MBSFN in downlink.
multiBandInfoList
A list of additionalSpectrumEmission i.e. one for each additional frequency band included in multiBandInfoList in SystemInformationBlockType1, listed in the same order.
ssac-BarringForMMTEL-Video
Service specific access class barring for MMTEL video originating calls.
ssac-BarringForMMTEL-Voice
Service specific access class barring for MMTEL voice originating calls.
ul-Bandwidth
Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth.
ul-CarrierFreq
For FDD: If absent, the (default) value determined from the default TX-RX frequency separation defined in TS 36.101 [42, table 5.7.3-1] applies.
For TDD: This parameter is absent and it is equal to the downlink frequency.
Apn-WhiteList
Bitmap showing which APNs are allowed, i.e., which APNs are in the APN white list. The first/leftmost bit is for the first APN, the second bit is for the second APN, and so on.

TABLE VII

SystemInformationBlockType2 information element, 3GPP TS 36.331

```
-- ASN1START
SystemInformationBlockType2 ::=      SEQUENCE {
      ac-BarringInfo                 SEQUENCE {
         ac-BarringForEmergency            BOOLEAN,
         ac-BarringForMO-Signalling        AC-BarringConfig            OPTIONAL,  -- Need OP
         ac-BarringForMO-Data              AC-BarringConfig            OPTIONAL   -- Need OP
      }                                                                OPTIONAL,  -- Need OP
      radioResourceConfigCommon      RadioResourceConfigCommonSIB,
      ue-TimersAndConstants          UE-TimersAndConstants,
      freqInfo                       SEQUENCE {
         ul-CarrierFreq                    ARFCN-ValueEUTRA            OPTIONAL,  -- Need OP
         ul-Bandwidth                      ENUMERATED {n6, n15, n25, n50, n75, n100}
                                                                       OPTIONAL,  -- Need OP
         additionalSpectrumEmission        AdditionalSpectrumEmission
      },
      mbsfn-SubframeConfigList       MBSFN-SubframeConfigList          OPTIONAL,  -- Need OR
      timeAlignmentTimerCommon       TimeAlignmentTimer,
      ...,
      lateNonCriticalExtension       OCTET STRING (CONTAINING SystemInformationBlockType2-v8h0-IEs)
                                     OPTIONAL,  -- Need OP
      [[ ssac-BarringForMMTEL-Voice-r9      AC-BarringConfig            OPTIONAL,  -- Need OP
         ssac-BarringForMMTEL-Video-r9      AC-BarringConfig            OPTIONAL   -- Need OP
      ]],
      [[ ac-BarringForCSFB-r10              AC-BarringConfig            OPTIONAL   -- Need OP
      ]]
}
```

TABLE VII-continued

SystemInformationBlockType2 information element, 3GPP TS 36.331

```
SystemInformationBlockType2-v8h0-IEs ::=       SEQUENCE {
    multiBandInfoList               SEQUENCE (SIZE (1..maxMultiBands)) OF
AdditionalSpectrumEmission          OPTIONAL, -- Need OR
    nonCriticalExtension            SystemInformationBlockType2-v9e0-IEs        OPTIONAL   -- Need OP
}
SystemInformationBlockType2-v9e0-IEs ::= SEQUENCE {
    ul-CarrierFreq-v9e0             ARFCN-ValueEUTRA-v9e0           OPTIONAL,  -- Cond ul-FreqMax
    nonCriticalExtension            SystemInformationBlockType2-v13xx-IEs      OPTIONAL   -- Need OP
}
SystemInformationBlockType2-v12xx-IEs ::= SEQUENCE {
Congestion-indication BOOLEAN OPTIONAL, -- Need OP
nonCriticalExtension SEQUENCE { } OPTIONAL -- Need OP
}
AC-BarringConfig ::=                SEQUENCE {
    ac-BarringFactor                ENUMERATED {
                                        p00, p05, p10, p15, p20, p25, p30, p40,
                                        p50, p60, p70, p75, p80, p85, p90, p95},
    ac-BarringTime                  ENUMERATED (s4, s8, s16, s32, s64, s128, s256, s512},
    ac-BarringForSpecialAC          BIT STRING (SIZE(5))
}
MBSFN-SubframeConfigList ::=        SEQUENCE (SIZE (1..maxMBSFN-Allocations)) OF MBSFN-SubframeConfig
--ASN1STOP
```

TABLE VIII

SystemInformationBlockType2 Field Descriptions ac-BarringFactor
If the random number drawn by the UE is lower than this value, access is allowed. Otherwise the access is barred.
The values are interpreted in the range [0, 1): p00 = 0, p05 = 0.05, p10 = 0.10, . . . , p95 = 0.95. Values other than p00 can only be set if all bits of the corresponding ac-BarringForSpecialAC are set to 0.
ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for AC 12, and so on.
Congestion-indication
Indication of congestion in the cell. Value TRUE indicates that there is congestion in the cell. Value TRUE may trigger the barring of access to some APNs.
ac-BarringTime
Mean access barring time value in seconds.
additionalSpectrum Emission
The UE requirements related to IE AdditionalSpectrumEmission are defined in TS 36.101 [42, table 6.2.4.1].
mbsfn-SubframeConfigList
Defines the subframes that are reserved for MBSFN in downlink.
multiBandInfoList
A list of additionalSpectrumEmission i.e. one for each additional frequency band included in multiBandInfoList in SystemInformationBlockType1, listed in the same order.
ssac-BarringForMMTEL-Video
Service specific access class barring for MMTEL video originating calls.
ssac-BarringForMMTEL-Voice
Service specific access class barring for MMTEL voice originating calls.
ul-Bandwidth
Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth.
ul-CarrierFreq
For FDD: If absent, the (default) value determined from the default TX-RX frequency separation defined in TS 36.101 [42, table 5.7.3-1] applies.
For TDD: This parameter is absent and it is equal to the downlink frequency.

Figure 7:
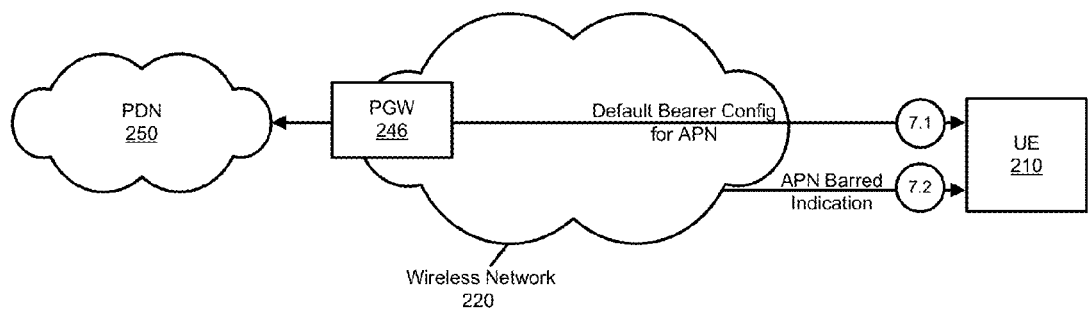

FIG. 7 is a diagram conceptually illustrating APN barring consistent with another aspect. In the implementation of FIG. 7, an APN is assigned a barring status (e.g., either to block the APN or not block the APN when APN barring is active, e.g., during a congestion situation) during the establishment of a default EPS bearer for the APN. UE 210 may store the obtained barring status, for the APN, and subsequently use the barring status, when APN barring is activated (e.g., during congestion), to determine whether to permit or bar requests, to the network, associated with the APN.

As illustrated in FIG. 7, at some point, such as when a data connection, associated with a particular APN, is first needed by an application executed by UE 210, UE 210 may initiate the establishment of a default bearer connection for UE 210 (at 7.1, "Default Bearer Configuration for APN"). As part of the configuration information exchanged for the default bearer connection, an indication may be provided (at 7.2, "APN Barred Indication"), to UE 210, of whether UE 210 should bar that APN when APN barring is active (e.g., during congestion). UE 210 may store the indication such that UE 210 maintains the indication even when the UE transitions between idle and active mode.

In one implementation, the indication of whether the APN should be barred when APN barring is active, may be provided to UE 210 as a field in the "Activate Default EPS Bearer Context Request" or the "Activate Dedicated EPS Bearer Context Request" message, as defined in the specification 3GPP TS 24.301. For example, an "APN Barring" field, having a Boolean value, may be included in the Activate Default EPS Bearer Context Request message, to indicate the APN barring status for the APN (e.g., whether the APN is to be barred or not barred whenever APN barring is active). The APN barring status may potentially be changed or reconfigured when the default bearer for the APN is reconfigured or when the default bearer is modified using a bearer modification procedure.

As with the implementations discussed with respect to FIGS. 6 and 7, the indication that APN barring is to be activated may be transmitted to UE 210 as part of a System Information Block Type 2 message, as defined in the technical specification 3GPP TS 36.331. For example, a "Congestion Indication Field," having a Boolean value, may be added to this message.

Table IX illustrates an example of the above-mentioned "APN Barring" field, Table X illustrates and example indication of whether APN barring is to be activated using a System Information Block Type 2 message, and Table XI illustrates field descriptions for the fields in Table X. In Tables IX-XI, bold text indicates text that may be added to the 3GPP TS 36.331 standard to implement the indication of congestion. In Table IX, the information element "APN Barring" identifies if the APN should be barred during congestion. It may be a one bit Boolean value.

TABLE IX

ACTIVATE DEFAULT EPS BEARER CONTEXT REQUEST message, 3 GPP TS 36.331

| IEI | Information Element | Type/Reference | Presence | Format | Length |
|---|---|---|---|---|---|
|  | Protocol discriminator | Protocol discriminator 9.2 | M | V | ½ |
|  | EPS bearer identity | EPS bearer identity 9.3.2 | M | V | ½ |
|  | Procedure transaction identity | Procedure transaction identity 9.4 | M | V | 1 |
|  | Activate default EPS bearer context request message identity | Message type 9.8 | M | V | 1 |
|  | EPS QoS | EPS quality of service 9.9.4.3 | M | LV | 2-14 |
|  | Access point name | Access point name 9.9.4.1 | M | LV | 2-101 |
|  | PDN address | PDN address 9.9.4.9 | M | LV | 6-14 |
| 5D | Transaction identifier | Transaction identifier 9.9.4.17 | O | TLV | 3-4 |
| 30 | Negotiated QoS | Quality of service 9.9.4.12 | O | TLV | 14-22 |
| 32 | Negotiated LLC SAPI | LLC service access point identifier 9.9.4.7 | O | TV | 2 |
| 8- | Radio priority | Radio priority 9.9.4.13 | O | TV | 1 |
| 34 | Packet flow Identifier | Packet flow Identifier 9.9.4.8 | O | TLV | 3 |
| 5E | APN-AMBR | APN aggregate maximum bit rate 9.9.4.2 | O | TLV | 4-8 |
| 58 | ESM cause | ESM cause 9.9.4.4 | O | TV | 2 |
| 27 | Protocol configuration options | Protocol configuration options 9.9.4.11 | O | TLV | 3-253 |
| B- | Connectivity type | Connectivity type 9.9.4.2A | O | TV | 1 |
| XX | APN Barring | APN Barring 9.9.4.X | O | TV or TLV | 1 or 3 |

TABLE X

SystemInformationBlockType2 information element, 3GPP TS 36.331

```
-- ASN1START
SystemInformationBlockType2 ::=    SEQUENCE {
    ac-BarringInfo                   SEQUENCE {
        ac-BarringForEmergency           BOOLEAN,
        ac-BarringForMO-Signalling       AC-BarringConfig         OPTIONAL,  -- Need
OP
        ac-BarringForMO-Data             AC-BarringConfig         OPTIONAL   -- Need
OP
    }                                                              OPTIONAL,  -- Need
OP
    radioResourceConfigCommon        RadioResourceConfigCommonSIB,
    ue-TimersAndConstants            UE-TimersAndConstants,
    freqInfo                         SEQUENCE {
        ul-CarrierFreq                   ARFCN-ValueEUTRA         OPTIONAL,  -- Need
```

TABLE X-continued

SystemInformationBlockType2 information element, 3GPP TS 36.331

```
    OP
            ul-Bandwidth                    ENUMERATED {n6, n15, n25, n50, n75, n100}
                                                                                    OPTIONAL,   -- Need
    OP
            additionalSpectrumEmission      AdditionalSpectrumEmission
        },
        mbsfn-SubframeConfigList            MBSFN-SubframeConfigList                OPTIONAL,   -- Need
    OR
        timeAlignmentTimerCommon            TimeAlignmentTimer,
        ...,
        lateNonCriticalExtension            OCTET STRING (CONTAINING SystemInformationBlockType2-v8h0-
    IEs)                                    OPTIONAL,   -- Need OP
        [[  ssac-BarringForMMTEL-Voice-r9   AC-BarringConfig                        OPTIONAL,   -- Need
    OP
            ssac-BarringForMMTEL-Video-r9   AC-BarringConfig                        OPTIONAL    -- Need
    OP
        ]],
        [[  ac-BarringForCSFB-r10           AC-BarringConfig                        OPTIONAL -- Need OP
        ]]
    }
    SystemInformationBlockType2-v8h0-IEs ::=    SEQUENCE {
        multiBandInfoList                   SEQUENCE (SIZE (1..maxMultiBands)) OF
    AdditionalSpectrumEmission              OPTIONAL,   -- Need OR
        nonCriticalExtension                SystemInformationBlockType2-v9e0-IEs    OPTIONAL    -- Need
    OP
    }
    SystemInformationBlockType2-v9e0-IEs ::= SEQUENCE {
        ul-CarrierFreq- v9e0                ARFCN-ValueEUTRA-v9e0                   OPTIONAL,   -- Cond ul-
    FreqMax
        nonCriticalExtension                SystemInformationBlockType2-v13xx-IEs   OPTIONAL --
    Need OP
    }
    SystemInformationBlockType2-v12xx-IEs ::= SEQUENCE {
    Congestion-indication BOOLEAN OPTIONAL, -- Need OP
    nonCriticalExtension SEQUENCE { } OPTIONAL -- Need OP
    }
    AC-BarringConfig ::=                    SEQUENCE {
        ac-BarringFactor                        ENUMERATED {
                                                    p00, p05, p10, p15, p20, p25, p30, p40,
                                                    p50, p60, p70, p75, p80, p85, p90, p95},
        ac-BarringTime                          ENUMERATED {s4, s8, s16, s32, s64, s128, s256, s512},
        ac-BarringForSpecialAC                  BIT STRING (SIZE(5))
    }
    MBSFN-SubframeConfigList ::=            SEQUENCE (SIZE (1..maxMBSFN-Allocations)) OF MBSFN-
    SubframeConfig
    --ASN1STOP
```

TABLE XI

SystemInformationBlockType2 Field Descriptions ac-BarringFactor
If the random number drawn by the UE is lower than this value, access is allowed. Otherwise the access is barred.
The values are interpreted in the range [0, 1): p00 = 0, p05 = 0.05, p10 = 0.10, . . . , p95 = 0.95. Values other than
p00 can only be set if all bits of the corresponding ac-BarringForSpecialAC are set to 0.
ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for AC 12, and so on.
Congestion-indication
Indication of congestion in the cell. Value TRUE indicates that there is congestion in the cell. Value TRUE
may trigger the barring of access to some APNs.
ac-BarringTime
Mean access barring time value in seconds.
additionalSpectrumEmission
The UE requirements related to IE AdditionalSpectrumEmission are defined in TS 36.101 [42, table 6.2.4.1].
mbsfn-SubframeConfigList
Defines the subframes that are reserved for MBSFN in downlink.

TABLE XI-continued

SystemInformationBlockType2 Field Descriptions multiBandInfoList
A list of additionalSpectrumEmission i.e. one for each additional frequency band included in multiBandInfoList in SystemInformationBlockType1, listed in the same order.
ssac-BarringForMMTEL-Video
Service specific access class barring for MMTEL video originating calls.
ssac-BarringForMMTEL-Voice
Service specific access class barring for MMTEL voice originating calls.
ul-Bandwidth
Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth.
ul-CarrierFreq
For FDD: If absent, the (default) value determined from the default TX-RX frequency separation defined in TS 36.101 [42, table 5.7.3-1] applies.
For TDD: This parameter is absent and it is equal to the downlink frequency.

Figure 8:
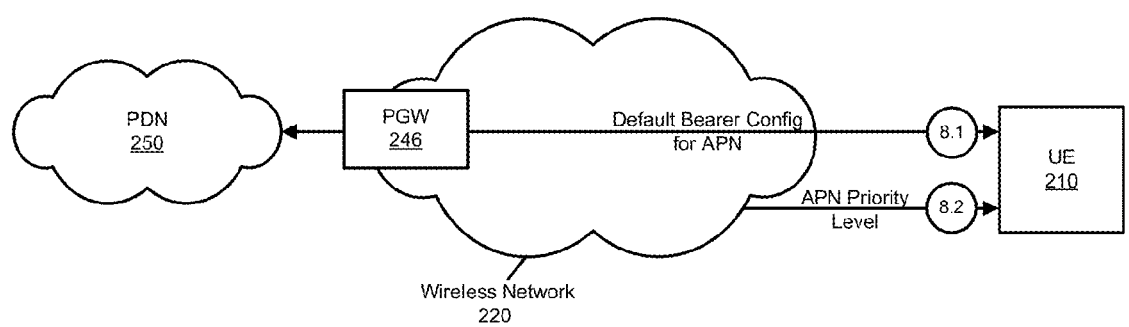

FIG. 8 is a diagram conceptually illustrating APN barring consistent with another aspect. In the implementation of FIG. 8, instead of assigning APNs based on a Boolean barring status value (i.e., block or not block the APN), as described with respect to FIG. 7, the barring status may be assigned as a priority level, such as an integer value in the range of zero to four (or some other value). APN barring may be made active by wireless network 220 by transmitting a target priority level to UE 210. APNs that are associated with a lower priority than the target priority level may be blocked.

As illustrated in FIG. 8, at some point, such as when a data connection, associated with a particular APN, is first needed by an application executed by UE 210, UE 210 may initiate the establishment of default bearer connection for UE 210 (at 8.1, "Default Bearer Configuration for APN"). As part of the configuration information exchanged for the default bearer connection, an indication may be provided (at 8.2, "APN Priority Level"), to UE 210, of the priority level (PL) of the APN associated with the default bearer connection. In one implementation, the priority level may be assigned from the range zero (PL0) to four (PL4), inclusive, where lower values indicate higher priority. UE 210 may store the priority level for the APN such that UE 210 maintains the priority level even when the UE transitions between idle and active mode.

In one implementation, the indication of the priority level may be provided to UE 210 as a field in the "Activate Default EPS Bearer Context Request" or the "Activate Dedicated EPS Bearer Context Request" message, as defined in the specification 3GPP TS 24.301. For example, an "APN Priority Level" field, having an integer value specified using up to three bits, may be included in the "Activate Default EPS Bearer Context Request" message, to indicate the APN priority level. The APN priority level may potentially be changed or reconfigured when the default bearer for the APN is reconfigured or when the default bearer is modified using a bearer modification procedure.

The indication that APN barring is to be activated may be transmitted to UE 210 as part of a System Information Block Type 2 message, as defined in the technical specification 3GPP TS 36.331. For example, a "Priority Level Indication" field may be set. The field may include priority value, such as between zero and four, inclusive, to indicate which APNs are permitted to initiate communications. In the implementation in which lower values indicate higher priority, APN communications may only be permitted by UE 210 if the priority value associated with the APN is less than or equal to the value of the "Priority Level Indication" field. In some implementations, the "Priority Level Indication" field may be set to zero to indicate no congestion (e.g., APN barring is not active). Alternatively, the "Priority Level Indication" field may be omitted to indicate no congestion.

Table XII, below, provides an example of APN priority levels, assigned to various APNs (APN1, APN2, APN3, and APN4), and when communication is allowed for the priority level. In Table XII, the possible APN priority levels may include PL0, PL1, PL2, and PL3. For example, in the first record of the table, the APN labeled "APN1" is assigned the priority level PL0, which may mean that no priority level is associated with this APN (i.e., communication with this APN is never barred). In the second record of the table, the APN labeled "APN2" is assigned the priority level PL1, which may indicate that communications are allowed with the APN whenever the priority level indication, set by wireless network 220, is equal to PL1, PL2, or PL3.

TABLE XII

| APN | APN Priority Level | Communication Allowed when Priority Level Indication sent by the network is |
|---|---|---|
| APN1 | PL0 | Any |
| APN2 | PL1 | PL1, PL2, PL3 |
| APN3 | PL2 | PL2, PL3 |
| APN4 | PL3 | PL3 |

Table XIII illustrates an example of the above-mentioned "APN Priority Level" field, Table XIV illustrates an example indication transmitting APN priority levels, and Table XV illustrates field descriptions for the fields in Table XIV. In Tables XIII-XV bold text indicates text that may be added to the 3GPP TS 36.331 or 3GPP TS 24.301 standard to implement the indication of congestion. In Table XIII, the information element "APN Priority Level" may be an integer (0 to maxPriorityLevels) which indicates the priority level of the APN. If an APN has priority level equal to x, then initial access to connect to the APN may only be allowed during congestion if the priority level indicated by the network in Priority-level-indication is equal to or greater than x. A value of zero may indicate that this APN is never barred.

TABLE XIII

ACTIVATE DEFAULT EPS BEARER CONTEXT REQUEST message, 3GPP TS 36.331

| IEI | Information Element | Type/Reference | Presence | Format | Length |
|---|---|---|---|---|---|
|  | Protocol discriminator | Protocol discriminator 9.2 | M | V | ½ |
|  | EPS bearer identity | EPS bearer identity 9.3.2 | M | V | ½ |
|  | Procedure transaction identity | Procedure transaction identity 9.4 | M | V | 1 |
|  | Activate default EPS bearer context request message identity | Message type 9.8 | M | V | 1 |
|  | EPS QoS | EPS quality of service 9.9.4.3 | M | LV | 2-14 |
|  | Access point name | Access point name 9.9.4.1 | M | LV | 2-101 |
|  | PDN address | PDN address 9.9.4.9 | M | LV | 6-14 |
| 5D | Transaction identifier | Transaction identifier 9.9.4.17 | O | TLV | 3-4 |
| 30 | Negotiated QoS | Quality of service 9.9.4.12 | O | TLV | 14-22 |
| 32 | Negotiated LLC SAPI | LLC service access point identifier 9.9.4.7 | O | TV | 2 |
| 8- | Radio priority | Radio priority 9.9.4.13 | O | TV | 1 |
| 34 | Packet flow Identifier | Packet flow Identifier 9.9.4.8 | O | TLV | 3 |
| 5E | APN-AMBR | APN aggregate maximum bit rate 9.9.4.2 | O | TLV | 4-8 |
| 58 | ESM cause | ESM cause 9.9.4.4 | O | TV | 2 |
| 27 | Protocol configuration options | Protocol configuration options 9.9.4.11 | O | TLV | 3-253 |
| B- | Connectivity type | Connectivity type 9.9.4.2A | O | TV | 1 |
| XY | APN Priority Level | APN Barring 9.9.4.X | O | TV or TLV | 1 or 3 |

TABLE XIV

SystemInformationBlockType2 information element, 3GPP TS 36.331

```
-- ASN1START
SystemInformationBlockType2 ::=      SEQUENCE {
    ac-BarringInfo                       SEQUENCE {
        ac-BarringForEmergeney               BOOLEAN,
        ac-BarringForMO-Signalling           AC-BarringConfig                 OPTIONAL,  -- Need OP
        ac-BarringForMO-Data                 AC-BarringConfig                 OPTIONAL   -- Need OP
    }                                                                         OPTIONAL,  -- Need OP
    radioResourceConfigCommon            RadioResourceConfigCommonSIB,
    ue-TimersAndConstants                UE-TimersAndConstants,
    freqInfo                             SEQUENCE {
        ul-CarrierFreq                       ARFCN-ValueEUTRA                 OPTIONAL,  -- Need OP
        ul-Bandwidth                         ENUMERATED {n6, n15, n25, n50, n75, n100}
                                                                              OPTIONAL,  -- Need OP
        additionalSpectrumEmission           AdditionalSpectrumEmission
    },
    mbsfn-SubframeConfigList             MBSFN-SubframeConfigList             OPTIONAL,  -- Need OR
    timeAlignmentTimerCommon             TimeAlignmentTimer,
    ...,
    lateNonCriticalExtension             OCTET STRING (CONTAINING SystemInformationBlockType2-v8h0-IEs)
                                                                              OPTIONAL   -- Need OP
    [[ ssac-BarringForMMTEL-Voice-r9       AC-BarringConfig                   OPTIONAL,  -- Need OP
       ssac-BarringForMMTEL-Video-r9       AC-BarringConfig                   OPTIONAL   -- Need OP
    ]],
    [[ ac-BarringForCSFB-r10               AC-BarringConfig                   OPTIONAL   -- Need OP
    ]]
}
```

TABLE XIV-continued

SystemInformationBlockType2 information element, 3GPP TS 36.331

```
SystemInformationBlockType2-v8h0-IEs ::=         SEQUENCE {
    multiBandInfoList                 SEQUENCE (SIZE (1..maxMultiBands)) OF
AdditionalSpectrumEmission          OPTIONAL,  -- Need OR
    nonCriticalExtension              SystemInformationBlockType2-v9e0-IEs         OPTIONAL   -- Need OP
}
SystemInformationBlockType2-v9e0-IEs ::= SEQUENCE {
    ul-CarrierFreq-v9e0               ARFCN-ValueEUTRA-v9e0            OPTIONAL,  -- Cond ul-FreqMax
    nonCriticalExtension              SystemInformationBlockType2-v13xx-IEs    OPTIONAL   -- Need OP
}
SystemInformationBlockType2-v13xx-IEs ::= SEQUENCE {
Priority-level-indication Integer (0 to maxPriorityLevels) OPTIONAL, -- Need OP
nonCriticalExtension SEQUENCE { } OPTIONAL -- Need OP
}
AC-BarringConfig ::=                   SEQUENCE {
    ac-BarringFactor                   ENUMERATED {
                                           p00, p05, p10, p15, p20, p25, p30, p40,
                                           p50, p60, p70, p75, p80, p85, p90, p95},
    ac-BarringTime                     ENUMERATED {s4, s8, s16, s32, s64, s128, s256, s512},
    ac-BarringForSpecialAC             BIT STRING (SIZE(5))
}
MBSFN-SubframeConfigList ::=           SEQUENCE (SIZE (1..maxMBSFN-Allocations)) OF MBSFN-SubframeConfig
--ASN1STOP
```

TABLE XV

SystemInformationBlockType2 Field Descriptions ac-BarringFactor
If the random number drawn by the UE is lower than this value, access is allowed. Otherwise the access is barred. The values are interpreted in the range [0, 1): p00 = 0, p05 = 0.05, p10 = 0.10, . . . , p95 = 0.95. Values other than p00 can only be set if all bits of the corresponding ac-BarringForSpecialAC are set to 0.
ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for AC 12, and so on.
Priority-level-indication
This field is sent during congestion. It indicates which APNs the UE can initiate communication with based on the APNPriorityLevel. A priority-level-indication = x, indicates that initial access to connect to an APN is only allowed if the APNPriorityLevel is equal to or less than x. A value of zero may indicate no congestion situation or the field can be optional and when not present that means there is no congestion There are up to maxPriorityLevels in the cell.
ac-BarringTime
Mean access barring time value in seconds.
additionalSpectrumEmission
The UE requirements related to IE AdditionalSpectrumEmission are defined in TS 36.101 [42, table 6.2.4.1].
mbsfn-SubframeConfigList
Defines the subframes that are reserved for MBSFN in downlink.
multiBandInfoList
A list of additionalSpectrumEmission i.e. one for each additional frequency band included in multiBandInfoList in SystemInformationBlockType1, listed in the same order.
ssac-BarringForMMTEL-Video
Service specific access class barring for MMTEL video originating calls.
ssac-BarringForMMTEL-Voice
Service specific access class barring for MMTEL voice originating calls.
ul-Bandwidth
Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth.
ul-CarrierFreq
For FDD: If absent, the (default) value determined from the default TX-RX frequency separation defined in TS 36.101 [42, table 5.7.3-1] applies.
For TDD: This parameter is absent and it is equal to the downlink frequency.

Figure 9:
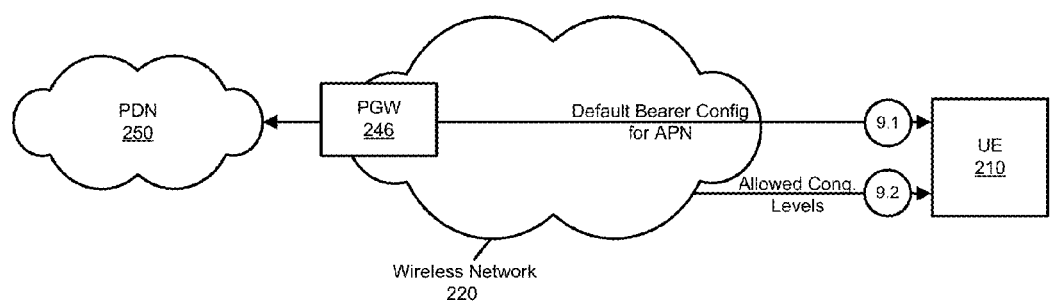

FIG. 9 is a diagram conceptually illustrating APN barring consistent with another aspect. In the implementation of FIG. 9, when the default EPS bearer for a given APN is configured, levels of acceptable congestion may be enumerated for the APN. When APN barring is active (e.g., when there is congestion), wireless network 220 may indicate the congestion level (CL) to UEs 210. A UE 210 may bar communication requests associated with APNs that are not associated with the congestion level indicated by wireless network 220.

As illustrated in FIG. 9, at some point, such as when a data connection, associated with a particular APN, is first needed by an application executed by UE 210, UE 210 may initiate the establishment of default bearer connection for UE 210 (at 9.1, "Default Bearer Configuration for APN"). As part of the configuration information exchanged for the default bearer connection, one or more congestion levels may be provided (at 9.2, "Allowed Congestion Levels") to UE 210. UE 210 may associated the provided congestion levels with the APN corresponding to the bearer connection. In one implementation, the congestion levels may be assigned from the range zero (CL0) to four (CL3), and an APN may be associated with multiple congestion levels. UE 210 may store the congestion level(s) for the APN such that UE 210 maintains the congestion levels even when the UE transitions between idle and active mode.

In one implementation, the congestion levels may be provided to UE 210 as a field in the "Activate Default EPS Bearer Context Request" or the "Activate Dedicated EPS Bearer Context Request" message, as defined in the specification 3GPP TS 24.301. For example, an "APN Congestion Levels Allowed" field may enumerate the congestion levels assigned to the APN. Alternatively, the "APN Congestion Levels Allowed" field may be implemented as a bitmap in which different bits in the bitmap correspond to different congestion levels. For example, for the congestion levels CL0-CL3, a four-bit bitmap may be used, in which each bit indicates whether a particular congestion level is assigned to the APN. Communication requests to connect to the APN may only be allowed when there is no congestion or when the network congestion level is equal to one of the values assigned to the APN.

The indication that APN barring is to be activated may be transmitted to UE 210 as part of a System Information Block Type 2 message, as defined in the technical specification 3GPP TS 36.331. For example, a "Congestion Level Indication" field may be set when APN barring is to be active, such as when there is congestion. This field may include an indication of a congestion level in a cell associated with UE 210. A congestion level of zero (or some other value) may indicate that there is no congestion in the cell (i.e., APN barring is not active).

Table XVI, below, provides an example of APN congestion levels, assigned to various APNs (APN1, APN2, APN3, and APN4). In Table XVI, the possible congestion level values may include CL0, CL1, CL2, and CL3. Communication may be allowed for any APN that is assigned a congestion level that matches the congestion level indicated by wireless network 220. For example, in the first record of the table, the APN labeled "APN1" is assigned the congestion level CL0, which may mean that communication with this APN is barred unless the network congestion level is CL0 (i.e., no congestion). In the second record of the table, the APN labeled "APN2" is assigned the congestion levels CL0 and CL2, which may mean that communication with this APN is barred unless the network congestion level is CL0 or CL2.

TABLE XVI

| APN | Congestion Levels Assigned to the APN |
|---|---|
| APN1 | CL0 |
| APN2 | CL0, CL2 |
| APN3 | CL0, CL1 |
| APN4 | CL0, CL1, CL2, CL3 |

Table XVII illustrates an example of the above-mentioned "APN Congestion Levels Allowed" field, Table XVIII illustrates an example indication of transmitting APN congestion levels, and Table XIX illustrates field descriptions for the fields in Table XVIII. In Tables XVII-XIX bold text indicates text that may be added to the 3GPP TS 36.331 or 3GPP TS 24.301 standard to implement the indication of congestion. In Table XVII, the information element "APN Congestion Level Allowed" may be a bitmap with the number of congestions levels or it could be an enumeration of the allowed congestion levels. Initial accesses to connect to the APN may be allowed if there is no congestion or if the congestion level in the cell indicated in Congestion-level-indication is equal to one of the configured values.

TABLE XVII

ACTIVATE DEFAULT EPS BEARER CONTEXT REQUEST message, 3GPP TS 36.331

| IEI | Information Element | Type/Reference | Presence | Format | Length |
|---|---|---|---|---|---|
|  | Protocol discriminator | Protocol discriminator 9.2 | M | V | ½ |
|  | EPS bearer identity | EPS bearer identity 9.3.2 | M | V | ½ |
|  | Procedure transaction identity | Procedure transaction identity 9.4 | M | V | 1 |
|  | Activate default EPS bearer context request message identity | Message type 9.8 | M | V | 1 |
|  | EPS QoS | EPS quality of service 9.9.4.3 | M | LV | 2-14 |
|  | Access point name | Access point name 9.9.4.1 | M | LV | 2-101 |
|  | PDN address | PDN address 9.9.4.9 | M | LV | 6-14 |
| 5D | Transaction identifier | Transaction identifier 9.9.4.17 | O | TLV | 3-4 |
| 30 | Negotiated QoS | Quality of service 9.9.4.12 | O | TLV | 14-22 |
| 32 | Negotiated LLC SAPI | LLC service access point identifier 9.9.4.7 | O | TV | 2 |
| 8- | Radio priority | Radio priority 9.9.4.13 | O | TV | 1 |
| 34 | Packet flow Identifier | Packet flow Identifier 9.9.4.8 | O | TLV | 3 |
| 5E | APN-AMBR | APN aggregate maximum bit rate 9.9.4.2 | O | TLV | 4-8 |
| 58 | ESM cause | ESM cause 9.9.4.4 | O | TV | 2 |

TABLE XVII-continued

ACTIVATE DEFAULT EPS BEARER CONTEXT REQUEST message, 3GPP TS 36.331

| IEI | Information Element | Type/Reference | Presence | Format | Length |
|---|---|---|---|---|---|
| 27 | Protocol configuration options | Protocol configuration options 9.9.4.11 | O | TLV | 3-253 |
| B- | Connectivity type | Connectivity type 9.9.4.2A | O | TV | 1 |
| XZ | APN Congestion Levels Allowed | APN Congestion Levels Allowed 9.9.4.X | O | TLV | 3-n |

TABLE XVIII

SystemInformationBlockType2 information element, 3GPP TS 36.331

```
-- ASN1START
SystemInformationBlockType2 ::=      SEQUENCE {
    ac-BarringInfo                       SEQUENCE {
        ac-BarringForEmergency               BOOLEAN,
        ac-BarringForMO-Signalling           AC-BarringConfig            OPTIONAL,   -- Need OP
        ac-BarringForMO-Data                 AC-BarringConfig            OPTIONAL    -- Need OP
    }                                                                    OPTIONAL,   -- Need OP
    radioResourceConfigCommon            RadioResourceConfigCommonSIB,
    ue-TimersAndConstants                UE-TimersAndConstants,
    freqInfo                             SEQUENCE {
        ul-CarrierFreq                       ARFCN-ValueEUTRA            OPTIONAL,   -- Need OP
        ul-Bandwidth                         ENUMERATED {n6, n15, n25, n50, n75, n100}
                                                                         OPTIONAL,   -- Need OP
        additionalSpectrumEmission           AdditionalSpectrumEmission
    },
    mbsfn-SubframeConfigList             MBSFN-SubframeConfigList        OPTIONAL,   -- Need OR
    timeAlignmentTimerCommon             TimeAlignmentTimer,
    ...,
    lateNonCriticalExtension             OCTET STRING (CONTAINING SystemInformationBlockType2-v8h0-IEs)
                                                                         OPTIONAL,   -- Need OP
    [[  ssac-BarringForMMTEL-Voice-r9        AC-BarringConfig            OPTIONAL,   -- Need OP
        ssac-BarringForMMTEL-video-r9        AC-BarringConfig            OPTIONAL    -- Need OP
    ]],
    [[  ac-BarringForCSFB-r10                AC-BarringConfig            OPTIONAL    -- Need OP
    ]]
}
SystemInformationBlockType2-v8h0-IEs ::=     SEQUENCE {
    multiBandInfoList                    SEQUENCE (SIZE (1..maxMultiBands)) OF
AdditionalSpectrumEmission               OPTIONAL,   -- Need OR
    nonCriticalExtension                 SystemInformationBlockType2-v9e0-IEs    OPTIONAL    -- Need OP
}
SystemInformationBlockType2-v9e0-IEs ::= SEQUENCE {
    ul-CarrierFreq-v9e0                  ARFCN-ValueEUTRA-v9e0           OPTIONAL,   -- Cond ul-FreqMax
    nonCriticalExtension                 SystemInformationBlockType2-v13xx-  OPTIONAL    --
                                         IEs
Need OP
}
SystemInformationBlockType2-v13xx-IEs ::= SEQUENCE {
Congestion-level-indication Integer (0 to maxCongestionLevels) OPTIONAL, -- Need OP
nonCriticalExtension SEQUENCE { } OPTIONAL -- Need OP
}
AC-BarringConfig ::=                 SEQUENCE {
    ac-BarringFactor                     ENUMERATED {
                                             p00, p05, p10, p15, p20, p25, p30, p40,
                                             p50, p60, p70, p75, p80, p85, p90, p95},
    ac-BarringTime                       ENUMERATED {s4, s8, s16, s32, s64, s128, s256, s512},
    ac-BarringForSpecialAC               BIT STRING (SIZE(5))
}
```

TABLE XVIII-continued

SystemInformationBlockType2 information element, 3GPP TS 36.331

MBSFN-SubframeConfigList ::=      SEQUENCE (SIZE (1..maxMBSFN-Allocations)) OF MBSFN-
SubframeConfig
--ASN1STOP

TABLE XIX

SystemInformationBlockType2 Field Descriptions ac-BarringFactor
If the random number drawn by the UE is lower than this value, access is allowed. Otherwise the access is barred.
The values are interpreted in the range [0, 1): p00 = 0, p05 = 0.05, p10 = 0.10, ..., p95 = 0.95. Values other than
p00 can only be set if all bits of the corresponding ac-BarringForSpecialAC are set to 0.
ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for AC 12, and so on.
Congestion-level-indication
Indication of congestion level in the cell. There are up to maxCongestionLevels in the cell. Congestion-
level-indication of 0 means no congestion.
ac-Barring Time
Mean access barring time value in seconds.
additionalSpectrumEmission
The UE requirements related to IE AdditionalSpectrumEmission are defined in TS 36.101 [42, table 6.2.4.1].
mbsfn-SubframeConfigList
Defines the subframes that are reserved for MBSFN in downlink.
multiBandInfoList
A list of additionalSpectrumEmission i.e. one for each additional frequency band included in multiBandInfoList in
SystemInformationBlockType1, listed in the same order.
ssac-BarringForMMTEL-Video
Service specific access class barring for MMTEL video originating calls.
ssac-BarringForMMTEL-Voice
Service specific access class barring for MMTEL voice originating calls.
ul-Bandwidth
Parameter: transmission bandwidth configuration, $N_{RB}$, in uplink, see TS 36.101 [42, table 5.6-1]. Value n6
corresponds to 6 resource blocks, n15 to 15 resource blocks and so on. If for FDD this parameter is absent, the
uplink bandwidth is equal to the downlink bandwidth. For TDD this parameter is absent and it is equal to the
downlink bandwidth.
ul-CarrierFreq
For FDD: If absent, the (default) value determined from the default TX-RX frequency separation defined in TS
36.101 [42, table 5.7.3-1] applies.
For TDD: This parameter is absent and it is equal to the downlink frequency.

In the description above, barring of network communications was described based on APN-based barring techniques. In some situations, multiple bearers, such as multiple EPS bearers, may be associated with the same APN. In this case, APN prioritization or other APN-based barring may not provide enough granularity in selecting which communications to bar. Additional granularity may be provided by barring communication sessions based on the bearer connection, such as based on an EPS bearer. Barring communications based on EPS bearers will be described below with reference to FIGS. 10A, 10B, and 11.

Figure 10A:
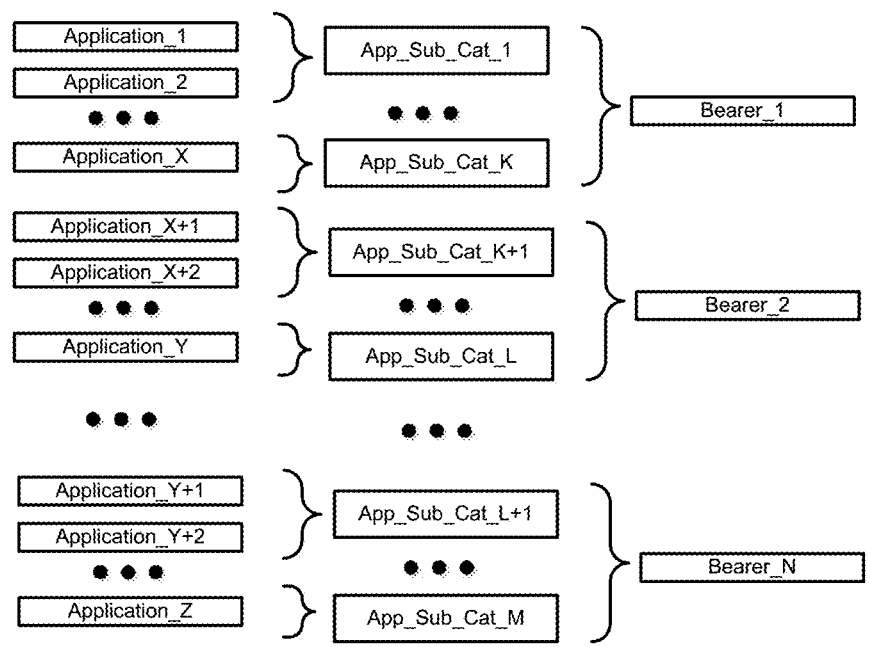
FIGS. 10A and 10B are diagrams illustrating mappings based on bearers.
Figure 10B:
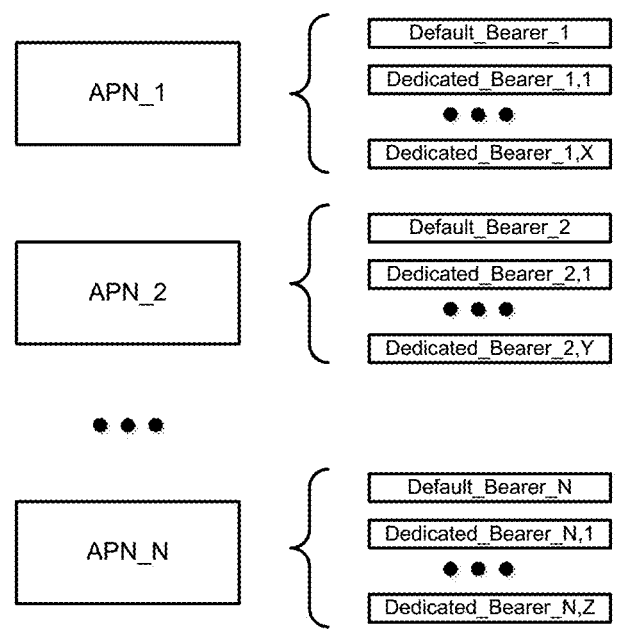

To perform EPS bearer barring, UE 210 may store mappings of EPS bearers to applications and/or a mapping of EPS bearers to APNs. FIGS. 10A and 10B are diagrams illustrating mappings that may be stored by UEs 210. The mappings shown in FIGS. 10A and 10B may be stored by UEs 210 via static storage that is configured during manufacture or provisioning of UEs 210. Alternatively or additionally, the mappings may be obtained, by UE 210, via dynamic techniques, such as through over the air (OTA) techniques, from wireless network 220. The mappings shown in FIGS. 10 and 10B may be stored by UEs 210 using one or more data structures.

As illustrated in FIG. 10A, applications may be associated with particular bearers, such as EPS bearers. In FIG. 10A, each of a number of bearers, labeled as Bearer_1 through Bearer_N, are illustrated as being associated with a number of applications and application sub-categories. For example, as shown, Bearer_1 is associated with the application sub-categories labeled as App_Sub_Cat_1 through App_Sub_Cat_K. App_Sub_Cat_1 may include the applications labeled as Application_1 and Application_2, and App_Sub_Cat_K may include the include the application labeled as Application_X. The association of application to categories and sub-categories may be similar to that described previously with respect to FIGS. 3A-3C. For instance, applications may be assigned to bearers based on the first matching one of a specific application identifier or the application-sub category. In other words, if a particular application is specifically indicated as corresponding to a bearer, the particular application may be associated with the bearer. If the particular application is not specifically indicated as corresponding to any bearer, but the particular application is associated with a sub-category, the particular application may be associated with the bearer based on the sub-category. The use of categories or sub-categories may be desirable if multiple applications can use the same bearer.

As illustrated in FIG. 10B, bearers may also be associated with APNs. In FIG. 10B, each of a number of APNs, labeled as APN_1 through APN_N, are illustrated as being associated with a number of bearers. In particular, APN_1 is associated with a default bearer for the APN, Default_Bearer_1, and the dedicated bearers labeled as Dedicated_Bearer_1,1 through Dedicated_Bearer_1,X. Similarly, APN_2 is associated with a default bearer for the APN, Default_Bearer_2, and the dedicated bearers labeled as Dedicated_Bearer_2,1 through Dedicated_Bearer_2,Y; APN_3 is associated with a default bearer for the APN, Default_Bearer_N, and the dedicated bearers labeled as Dedicated_Bearer_N,1 through Dedicated_Bearer_N,Z.

Figure 11:
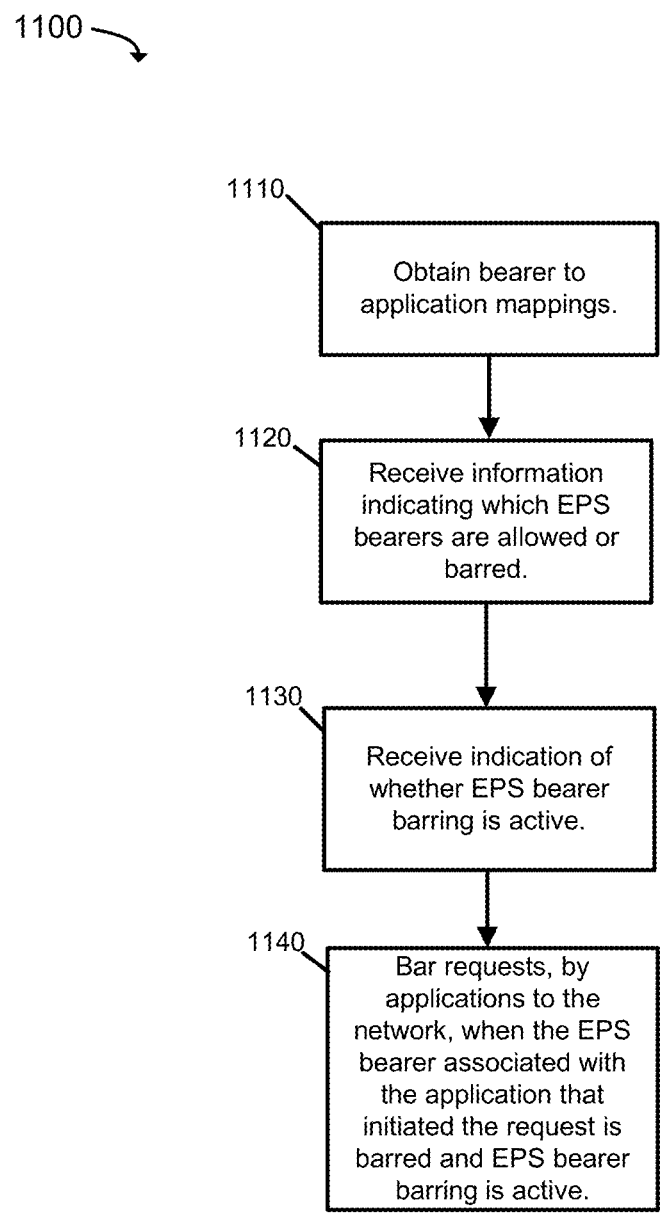
FIG. 11 is a flowchart illustrating an example of a process relating to bearer barring.

FIG. 11 is a flowchart illustrating an example of a process 1100 relating to EPS bearer barring. Process 1100 may be performed by, for example, UE 210.

Process 1100 may include obtaining bearer to application mappings (block 1110). The bearer to application mappings may be dynamically (on-the-fly) obtained and stored by UE 210 as bearers are established for applications. The mappings may be stored as one or more data structures, such as those illustrated with respect to FIGS. 10A and 10B.

Process 1100 may further include receiving information indicating which EPS bearers are allowed or barred (block 1120). The information may thus indicate the barring status of the EPS bearers. The information can be transmitted using a broadcast message or a non-broadcast (e.g., dedicated unicast message), such as a message that includes a list of barred EPS bearers. The EPS bearers may be identified by EPS bearer identification (ID) values.

In one implementation, the information indicating which bearers are allowed or barred may be communicated during an extended service request and tracking area update procedure that is performed between UE 210 and wireless network 220. For example, the Extended Service Request message, as defined in the 3GPP TS 24.301 standard, may additionally include an "EPS Bearer Barring Status Bitmap" field, which may include a bit corresponding to all EPS bearers associated with wireless network 220 and/or all the activated EPS bearers. Each bit may indicate whether the corresponding EPS bearer is barred or allowed.

Alternatively or additionally, instead of transmitting a separate message to convey the information indicating which bearers are allowed or barred, the information can be communicated to UE 210 as part of the initial configuration of an EPS bearer. For example, the Activate Default EPS Bearer Context Accept message and/or the Activate Dedicated EPS Bearer Context Request message, as defined in the 3GPP TS 24.301 standard, may include an "EPS Bearer Barring Status" field, which may be assigned a value, such as a Boolean value, indicating whether the particular EPS bearer is a bearer that is to be allowed or barred. Thus, in this implementation, the initial configuration of the EPS bearer may include an indication of whether the EPS bearer should be barred during a network congestion state. The indication of whether to bar or not bar a particular EPS bearer may be stored by UE 210 as part of the UE context data, such as via a "Barring Status" field added to the UE context data or to Quality of Service (QoS) information associated with the UE context data. For example, the UE context data may include a "Barring Status" field that is used to indicate the barring status of the EPS bearer when the network indicates that there is congestion.

The initial configuration of an EPS bearer may be made in response to execution of an application by UE 210. The received information indicating whether the corresponding bearer is allowed or barred may be used by UE 210 when the application is next executed to determine whether to initiate a communication session for the application.

Examples of "EPS Bearer Barring Status" fields, as potentially implemented in Activate Default EPS Bearer Context Accept message and Activate Dedicated EPS Bearer Context Request messages, are illustrated in Tables XX and XXI. In these tables, the "EPS Bearer Barring Status" field may identify if the EPS bearer should be barred during a congestion condition. The field may be a one bit Boolean value.

TABLE XX

Activate Default EPS Bearer Context Accept message, 3GPP TS 24.301

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | Activate default EPS bearer context accept message identity | Message type 9.8 | M | V | 1 |
| 27 | Protocol configuration options | Protocol configuration options 9.9.4.11 | O | TLV | 3-253 |
| YY | EPS Bearer Barring Status | EPS Bearer Barring Status 9.9.4.X | O | TV | 1 |

TABLE XXI

Activate Default EPS Bearer Context Request message, 3GPP TS 24.301

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | Activate dedicated EPS bearer context request message identity | Message type 9.8 | M | V | 1 |
| | Linked EPS bearer identity | Linked EPS bearer identity 9.9.4.6 | M | V | ½ |
| | Spare half octet | Spare half octet 9.9.2.9 | M | V | ½ |
| | EPS QoS | EPS quality of service 9.9.4.3 | M | LV | 2-14 |

TABLE XXI-continued

Activate Default EPS Bearer Context Request message, 3GPP TS 24.301

| IEI | Information Element | Type/Reference | Presence | Format | Length |
|---|---|---|---|---|---|
|  | TFT | Traffic flow template 9.9.4.16 | M | LV | 2-256 |
| 5D | Transaction identifier | Transaction identifier 9.9.4.17 | O | TLV | 3-4 |
| 30 | Negotiated QoS | Quality of service 9.9.4.12 | O | TLV | 14-22 |
| 32 | Negotiated LLC SAPI | LLC service access point identifier 9.9.4.7 | O | TV | 2 |
| 8- | Radio priority | Radio priority 9.9.4.13 | O | TV | 1 |
| 34 | Packet flow Identifier | Packet flow Identifier 9.9.4.8 | O | TLV | 3 |
| 27 | Protocol configuration options | Protocol configuration options 9.9.4.11 | O | TLV | 3-253 |
| YY | EPS Bearer Barring Status | EPS Bearer Barring Status 9.9.4.X | O | TV | 1 |

Examples of UE context data, being used to store a barring status of an EPS bearer, is indicated in Tables XXII and XXIII.

TABLE XXII

UE Context, 3GPP TS 23.401

| Field | Description |
|---|---|
| IMSI | IMSI (International Mobile Subscriber Identity) is the subscribers permanent identity. |
| EMM State | Mobility management state EMM-REGISTERED, EMM-DEREGISTERED. |
| GUTI | Globally Unique Temporary Identity. |
| ME Identity | Mobile Equipment Identity - (e.g. IMEI/IMEISV) Software Version Number. |
| Tracking Area List | Current Tracking area list. |
| last visited TAI | A TAI which is contained in the TA list the UE registered to the network and which identifies the tracking area last visited by the UE. |
| Selected NAS Algorithm | Selected NAS security algorithm. |
| Selected AS Algorithm | Selected AS security algorithms. |
| eKSI | Key Set Identifier for the main key $K_{ASME}$. Also indicates whether the UE is using security keys derived from UTRAN or E-UTRAN security association |
| $K_{ASME}$ | Main key for E-UTRAN key hierarchy based on CK, IK and Serving network identity. |
| NAS Keys and COUNT | $K_{NASint}$, $K_{NASenc}$, and NAS COUNT parameter. |
| Temporary Identity used in Next update (TIN) | This parameter is used internally by the UE to memorise which temporary ID it has to indicate in the Attach Request and RAU/TAU Request as specified in clause 4.3.5.6. |
| UE Specific DRX Parameters | Preferred E-UTRAN DRX cycle length |
| Allowed CSG list | The Allowed CSG list, which is under both user and operator control, indicates the list of CSG IDs and the associated PLMN where the UE is a member. |
| Operator CSG list | The Operator CSG list, which is under exclusive Operator control, indicates the list of CSG IDs and the associated PLMN where the UE is a member. |
| For each active PDN connection: | |
| APN in Use | The APN currently used. This APN shall be composed of the APN Network Identifier and the default APN Operator Identifier, as specified in TS 23.003 [9], clause 9.1.2. |
| APN-AMBR | The maximum aggregated uplink and downlink MBR to be shared across all Non-GBR bearers, which are established for this APN. |
| Assigned PDN Type | The PDN Type assigned by the network (IPv4, IPv6, or IPv4v6). |
| IP Address(es) | IPv4 address and/or IPv6 prefix |
| Default Bearer | Identifies the default bearer within the PDN connection by its EPS Bearer Id. The default bearer is the one which is established first within the PDN connection. |
| For each EPS Bearer within the PDN connection | |
| EPS Bearer ID | An EPS bearer identity uniquely identifies an EPS bearer for one UE accessing via E-UTRAN. |
| TI | Transaction Identifier |

TABLE XXII-continued

UE Context, 3GPP TS 23.401

| Field | Description |
|---|---|
| EPS bearer QoS | GBR and MBR for GBR bearer. |
| TFT | Traffic Flow Template. |
| Barring Status | This parameter is used to indicate the barring status of the EPS bearer when the network indicates that there is a congestion. |

As another option this information could be part of the EPS bearer QoS, and be saved in the QoS information at the UE context.

TABLE XXII

UE Context, 3GPP TS 23.401

| Field | Description |
|---|---|
| IMSI | IMSI (International Mobile Subscriber Identity) is the subscribers permanent identity. |
| EMM State | Mobility management state EMM-REGISTERED, EMM-DEREGISTERED. |
| GUTI | Globally Unique Temporary Identity. |
| ME Identity | Mobile Equipment Identity - (e.g. IMEI/IMEISV) Software Version Number. |
| Tracking Area List | Current Tracking area list. |
| last visited TAI | A TAI which is contained in the TA list the UE registered to the network and which identifies the tracking area last visited by the UE. |
| Selected NAS Algorithm | Selected NAS security algorithm. |
| Selected AS Algorithm | Selected AS security algorithms. |
| eKSI | Key Set Identifier for the main key $K_{ASME}$. Also indicates whether the UE is using security keys derived from UTRAN or E-UTRAN security association |
| $K_{ASME}$ | Main key for E-UTRAN key hierarchy based on CK, IK and Serving network identity. |
| NAS Keys and COUNT | $K_{NASint}$, $K_{NASenc}$, and NAS COUNT parameter. |
| Temporary Identity used in Next update (TIN) | This parameter is used internally by the UE to memorise which temporary ID it has to indicate in the Attach Request and RAU/TAU Request as specified in clause 4.3.5.6. |
| UE Specific DRX Parameters | Preferred E-UTRAN DRX cycle length |
| Allowed CSG list | The Allowed CSG list, which is under both user and operator control, indicates the list of CSG IDs and the associated PLMN where the UE is a member. |
| Operator CSG list | The Operator CSG list, which is under exclusive Operator control, indicates the list of CSG IDs and the associated PLMN where the UE is a member. |
| For each active PDN connection: | |
| APN in Use | The APN currently used. This APN shall be composed of the APN Network Identifier and the default APN Operator Identifier, as specified in TS 23.003 [9], clause 9.1.2. |
| APN-AMBR | The maximum aggregated uplink and downlink MBR to be shared across all Non-GBR bearers, which are established for this APN. |
| Assigned PDN Type | The PDN Type assigned by the network (IPv4, IPv6, or IPv4v6). |
| IP Address(es) | IPv4 address and/or IPv6 prefix |
| Default Bearer | Identifies the default bearer within the PDN connection by its EPS Bearer Id. The default bearer is the one which is established first within the PDN connection. |
| For each EPS Bearer within the PDN connection | |
| EPS Bearer ID | An EPS bearer identity uniquely identifies an EPS bearer for one UE accessing via E-UTRAN. |
| TI | Transaction Identifier |
| EPS bearer QoS | GBR and MBR for GBR bearer and Barring Status. |
| TFT | Traffic Flow Template. |

The information may also be saved in an EPS quality of service information element. An example EPS quality of service information element is given below in table XXIII bold text indicates text that may be added to the 3GPP TS 24.301 standard.

TABLE XXIII

EPS Quality of Service Information Element, 3GPP TS 23.401

| | |
|---|---|
| EPS quality of service IEI | octet 1 |
| Length of EPS quality of service contents | octet 2 |
| QCI | octet 3 |
| Maximum bit rate for uplink | octet 4 |
| Maximum bit rate for downlink | octet 5 |
| Guaranteed bit rate for uplink | octet 6 |
| Guaranteed bit rate for downlink | octet 7 |
| Maximum bit rate for uplink (extended) | octet 8 |
| Maximum bit rate for downlink (extended) | octet 9 |
| Guaranteed bit rate for uplink (extended) | octet 10 |
| Guaranteed bit rate for downlink (extended) | octet 11 |
| Maximum bit rate for uplink (extended-2) | octet 12 |
| Maximum bit rate for downlink (extended-2) | octet 13 |
| Guaranteed bit rate for uplink (extended-2) | octet 14 |
| Guaranteed bit rate for downlink (extended-2) | octet 15 |
| Barring Status | octet 16 |

Process 1100 may further include receiving an indication of whether EPS bearer barring is active (block 1130). For example, EPS bearer barring may be made active, on a per-cell basis, based on a congestion level associated with a radio interface of a cell associated with eNodeB 232. Wireless network 220 may, for example, broadcast an indication of congestion (i.e., broadcast the indication that EPS bearer barring is active) as part of a System Information Block Type 2 message, as defined in the technical specification 3GPP TS 36.331. For example, a "Congestion Indication" field, having a Boolean value, may be added to this message.

Alternatively, the EPS bearer barring status may be assigned as one of a number of priority levels. In this implementation, the information indicating which bearers are allowed or barred may instead associate an EPS bearer to a priority level. A network priority value may act as a threshold to determine whether to allow or bar the EPS bearer. For instance, when the network EPS bearer barring status is equal to or greater than the priority level assigned to a particular EPS bearer, the particular EPS bearer may be allowed, otherwise the EPS bearer may be barred. As an example of different EPS bearers being assigned different priority levels, assume the EPS bearers having the IDs of 5, 6, 7, and 8, are respectively associated with the priority levels (PL) of PL0, PL3, PL1, and PL0, respectively. In this example, when the network congestion level is PL2, the EPS bearers having IDs of 5, 7, and 8 may be allowed and the EPS bearer having the ID 6 may be barred.

Alternatively, the EPS bearer barring status may be provided as an enumeration of congestion levels. In this implementation, the information indicating which bearers are allowed or barred may instead associate an EPS bearer to one or more congestion levels. The network may transmit an indication of the allowed congestion values. EPS bearers that are associated with the current network congestion level may be allowed, while other EPS bearers may be barred.

In some implementations, the status relating to whether EPS bearer barring is active, instead of being received as a Boolean value indicating whether EPS bearer barring is active or not active, may be received as another value, such as a probability of performing EPS bearer barring or a time period over which EPS bearer barring is to be active. With respect to receiving the barring status as a probability, UE 210 may generate a random number and compare the random number to the received probability value to indicate whether EPS bearer barring is to be active for the specific UE. Once the EPS Bearer is configured for that application and a barring status is allocated, the UE may save that information. In the future, when the UE is trying to establish a connection for that same application, the UE may retrieve the saved barring status of the EPS bearer that was used to carry that application. Thus, this saved information may provide to the UE the barring status of the application itself. Priority may thus be given to certain applications by barring the access of other applications. This barring functionality may apply to registered UEs that are trying to initiate access to establish a connection for a given application; this could happen for registered UEs in both idle mode or connected mode. This barring can also be a trigger for UEs that already have an application connection established, to force the UE to drop the connection and close the application. The techniques discussed here can apply to both cases, depending on operator preference.

Process 1100 may further include barring requests, by applications to the network, when the EPS bearer associated with an application that initiated the request is barred and when EPS barring is active (block 1140). Thus, when a data request, by an application, is initiated at the UE when EPS bearer barring is active, process 1100 may include barring the request when the EPS bearer associated with the application is barred. As previously mentioned, whether the EPS bearer associated with an application is to be barred when EPS barring is active (e.g., due to congestion) may have previously received, by UE 210, from wireless network 220, either based on a message previously received from wireless network 220 or based on information obtained during a previous configuration of the EPS bearer.

Tables XXIII and XXIV illustrate one example implementation of a technique to indicate congestion (e.g., to indicate whether EPS barring is active) using a System Information Block Type 2 message. Table XXIV includes field descriptions for the fields in Table XXIII. In Table III, bold text indicates text that may be added to the 3GPP TS 36.331 standard.

TABLE XXIII

SystemInformationBlockType2 information element, 3GPP TS 36.331

```
-- ASN1START
SystemInformationBlockType2 ::=   SEQUENCE {
      ac-BarringInfo                 SEQUENCE {
            ac-BarringForEmergency         BOOLEAN,
            ac-BarringForMO-Signalling     AC-BarringConfig      OPTIONAL,  -- Need
OP
            ac-BarringForMO-Data           AC-BarringConfig      OPTIONAL,  -- Need
OP
      }                                                          OPTIONAL,  -- Need
```

TABLE XXIII-continued

SystemInformationBlockType2 information element, 3GPP TS 36.331

```
OP
    radioResourceConfigCommon          RadioResourceConfigCommonSIB,
    ue-TimersAndConstants              UE-TimersAndConstants,
    freqInfo                           SEQUENCE {
        ul-CarrierFreq                     ARFCN-ValueEUTRA              OPTIONAL,  -- Need
OP
        ul-Bandwidth                       ENUMERATED {n6, n15, n25, n50, n75, n100}
                                                                         OPTIONAL,  -- Need
OP
        additionalSpectrumEmission         AdditionalSpectrumEmission
    },
    mbsfn-SubframeConfigList           MBSFN-SubframeConfigList           OPTIONAL,  -- Need
OR
    timeAlignmentTimerCommon           TimeAlignmentTimer,
    ...,
    lateNonCriticalExtension           OCTET STRING (CONTAINING SystemInformationBlockType2-v8h0-
IEs)                                   OPTIONAL,  -- Need OP
    [[  ssac-BarringForMMTEL-Voice-r9     AC-BarringConfig               OPTIONAL,  -- Need
OP
        ssac-BarringForMMTEL-Video-r9     AC-BarringConfig               OPTIONAL   -- Need
OP
    ]],
    [[  ac-BarringForCSFB-r10             AC-BarringConfig               OPTIONAL   -- Need OP
    ]]
}
SystemInformationBlockType2-v8h0-IEs ::=   SEQUENCE {
    multiBandInfoList              SEQUENCE (SIZE (1..maxMultiBands)) OF
AdditionalSpectrumEmission         OPTIONAL,  -- Need OR
    nonCriticalExtension               SystemInformationBlockType2-v9e0-IEs        OPTIONAL   -- Need
OP
}
SystemInformationBlockType2-v13xx-IEs ::= SEQUENCE {
CongestionIndication BOOLEAN OPTIONAL, -- Need OP
nonCriticalExtension SEQUENCE { } OPTIONAL -- Need OP
}
SystemInformationBlockType2-v9e0-IEs ::= SEQUENCE {
    ul-CarrierFreq-v9e0                ARFCN-ValueEUTRA-v9e0            OPTIONAL,  -- Cond ul-
FreqMax
    nonCriticalExtension               SystemInformationBlockType2-v13xx-IEs       OPTIONAL   --
Need OP
}
AC-BarringConfig ::=              SEQUENCE {
    ac-BarringFactor                  ENUMERATED {
                                          p00, p05, p10, p15, p20, p25, p30, p40,
                                          p50, p60, p70, p75, p80, p85, p90, p95},
    ac-BarringTime                    ENUMERATED {s4, s8, s16, s32, s64, s128, s256, s512},
    ac-BarringForSpecialAC            BIT STRING (SIZE(5))
}
MBSFN-SubframeConfigList ::=      SEQUENCE (SIZE (1..maxMBSFN-Allocations)) OF MBSFN-
SubframeConfig
--ASN1STOP
```

TABLE XXIV

SystemInformationBlockType2 Field Descriptions ac-BarringFactor
If the random number drawn by the UE is lower than this value, access is allowed. Otherwise the access is barred.
The values are interpreted in the range [0, 1): p00 = 0, p05 = 0.05, p10 = 0.10, . . . , p95 = 0.95. Values other than
p00 can only be set if all bits of the corresponding ac-BarringForSpecialAC are set to 0.
ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for AC 12, and so on.
ac-BarringTime
Mean access barring time value in seconds.
additionalSpectrumEmission
The UE requirements related to IE AdditionalSpectrumEmission are defined in TS 36.101 [42, table 6.2.4.1].

TABLE XXIV-continued

SystemInformationBlockType2 Field Descriptions mbsfn-SubframeConfigList
Defines the subframes that are reserved for MBSFN in downlink.
multiBandInfoList
A list of additionalSpectrumEmission i.e. one for each additional frequency band included in multiBandInfoList in
SystemInformationBlockType1, listed in the same order.
ssac-BarringForMMTEL-Video
Service specific access class barring for MMTEL video originating calls.
ssac-BarringForMMTEL-Voice
Service specific access class barring for MMTEL voice originating calls.
ul-Bandwidth
Parameter: transmission bandwidth configuration, $N_{RB}$, in uplink, see TS 36.101 [42, table 5.6-1]. Value n6
corresponds to 6 resource blocks, n15 to 15 resource blocks and so on. If for FDD this parameter is absent, the
uplink bandwidth is equal to the downlink bandwidth. For TDD this parameter is absent and it is equal to the
downlink bandwidth.
ul-CarrierFreq
For FDD: If absent, the (default) value determined from the default TX-RX frequency separation defined in TS
36.101 [42, table 5.7.3-1] applies.
For TDD: This parameter is absent and it is equal to the downlink frequency.
CongestionIndication
This parameter is set to 1 when there is network congestion that the network wants the UE to bar specific
applications barred to specific EPS bearers as indicated in the BarringStatus IE.

In some implementations, during extended service request and tracking area update procedures, UE 210 and the network can synchronize the barring status of activated EPS bearers by adding an information element similar to the EPS bearer context status. Examples of an implementation of synchronization messages, implemented as an Extended Service Request Message, Tracking Area Update Request Message, or Tracking Area Update Accept Message, in the 3GPP TS 24.301 standard, are illustrated below in Tables XXV, XXVI, and XXVII, respectively. In these tables, bold text indicates text that may be added to the 3GPP TS 24.301 standard.

TABLE XXV

Extended Service Request Message, 3GPP TS 23.401

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Extended service request message identity | Message type 9.8 | M | V | 1 |
| | Service type | Service type 9.9.3.27 | M | V | ½ |
| | NAS key set identifier | NAS key set identifier 9.9.3.21 | M | V | ½ |
| | M-TMSI | Mobile identity 9.9.2.3 | M | LV | 6 |
| B- | CSFB response | CSFB response 9.9.3.5 | C | TV | 1 |
| 57 | EPS bearer context status | EPS bearer context status 9.9.2.1 | O | TLV | 4 |
| D- | Device properties | Device properties 9.9.2.0A | O | TV | 1 |
| YZ | EPS bearer barring status bitmap | EPS bearer barring status bitmap 9.9.2.X | O | TLV | 4 |

TABLE XXVI

Tracking Area Update Request Message, 3GPP TS 23.401

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Tracking area update request message identity | Message type 9.8 | M | V | 1 |
| | EPS update type | EPS update type 9.9.3.14 | M | V | ½ |
| | NAS key set identifier | NAS key set identifier 9.9.3.21 | M | V | ½ |
| | Old GUTI | EPS mobile identity 9.9.3.12 | M | LV | 12 |
| B- | Non-current native NAS key set identifier | NAS key set identifier 9.9.3.21 | O | TV | 1 |
| 8- | GPRS ciphering key sequence number | Ciphering key sequence number 9.9.3.4a | O | TV | 1 |
| 19 | Old P-TMSI signature | P-TMSI signature 9.9.3.26 | O | TV | 4 |
| 50 | Additional GUTI | EPS mobile identity 9.9.3.12 | O | TLV | 13 |
| 55 | Nonce$_{UE}$ | Nonce 9.9.3.25 | O | TV | 5 |
| 58 | UE network capability | UE network capability 9.9.3.34 | O | TLV | 4-15 |
| 52 | Last visited registered TAI | Tracking area identity 9.9.3.32 | O | TV | 6 |
| 5C | DRX parameter | DRX parameter 9.9.3.8 | O | TV | 3 |
| A- | UE radio capability information update needed | UE radio capability information update needed 9.9.3.35 | O | TV | 1 |

TABLE XXVI-continued

Tracking Area Update Request Message, 3GPP TS 23.401

| IEI | Information Element | Type/Reference | Presence | Format | Length |
|---|---|---|---|---|---|
| 57 | EPS bearer context status | EPS bearer context status 9.9.2.1 | O | TLV | 4 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
| F- | Additional update type | Additional update type 9.9.3.0B | O | TV | 1 |
| 5D | Voice domain preference and UE's usage setting | Voice domain preference and UE's usage setting 9.9.3.44 | O | TLV | 3 |
| E- | Old GUTI type | GUTI type 9.9.3.45 | O | TV | 1 |
| D- | Device properties | Device properties 9.9.2.0A | O | TV | 1 |
| C- | MS network feature support | MS network feature support 9.9.3.20A | O | TV | 1 |
| 10 | TMSI based NRI container | Network resource identifier container 9.9.3.24A | O | TLV | 4 |
| YZ | EPS bearer barring status bitmap | EPS bearer barring status bitmap 9.9.2.X | O | TLV | 4 |

TABLE XXVII

Tracking Area Update Accept Message, 3GPP TS 23.401

| IEI | Information Element | Type/Reference | Presence | Format | Length |
|---|---|---|---|---|---|
|  | Protocol discriminator | Protocol discriminator 9.2 | M | V | ½ |
|  | Security header type | Security header type 9.3.1 | M | V | ½ |
|  | Tracking area update accept message identity | Message type 9.8 | M | V | 1 |
|  | EPS update result | EPS update result 9.9.3.13 | M | V | ½ |
|  | Spare half octet | Spare half octet 9.9.2.9 | M | V | ½ |
| 5A | T3412 value | GPRS timer 9.9.3.16 | O | TV | 2 |
| 50 | GUTI | EPS mobile identity 9.9.3.12 | O | TLV | 13 |
| 54 | TAI list | Tracking area identity list 9.9.3.33 | O | TLV | 8-98 |
| 57 | EPS bearer context status | EPS bearer context status 9.9.2.1 | O | TLV | 4 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16B | O | TLV | 3 |
| YZ | EPS bearer barring status | EPS bearer barring status bitmap 9.9.2.X | O | TLV | 4 |

In tables XXV and XXVI, the field "EPS bearer barring status bitmap" map be used to indicate the barring status of each activated EPS bearer when EPS bearer barring is active (e.g., during congestion). The EPS bearer may be identified by an EPS bearer identity value. One example of the coding the bitmap is illustrated in Table XXVIII. As illustrated in Table XXVIII, the bitmap may be a four octet bitmap in which the first octet in which the first octet includes the EPS bearer barring status bitmap IEI, the second octet includes the length of the bitmap contents, and bit values labeled as EBI(0) through EBI(15). EBI(x) may be encoded as follows:

EBI(0)-EBI(4): spare bits that may be encoded as zero;

EBI(5)-EBI(15): a zero value indicates that the EPS bearer barring status during congestion is "bearer context not barred," and a one value indicates that the EPS bearer barring status during congestion is "bearer context barred."

TABLE XXVIII

| EPS bearer barring status bitmap IEI | | | | | | | | octet 1 |
|---|---|---|---|---|---|---|---|---|
| Length of EPS bearer barring status bitmap contents | | | | | | | | octet 2 |
| EBI(7) | EBI(6) | EBI(5) | EBI(4) | EBI(3) | EBI(2) | EBI(1) | EBI(0) | octet 3 |
| EBI(8) | EBI(9) | EBI(10) | EBI(11) | EBI(12) | EBI(13) | EBI(14) | EBI(15) | octet 4 |

Figure 12:
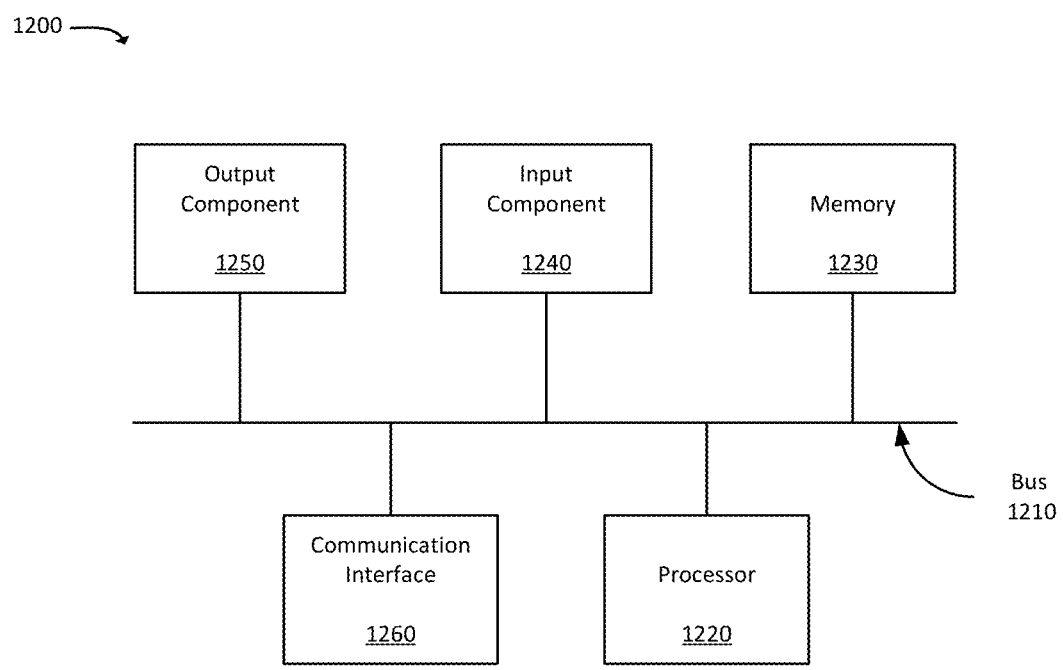
FIG. 12 is a diagram of example components of a device.

FIG. 12 is a diagram of example components of a device 1200. Each of the devices illustrated in FIGS. 1A, 1B, 2, and 5-9 may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include processing circuitry, such as a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes (LEDs), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared (IR) receiver, a Bluetooth® radio, a WiFi radio, a cellular radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 4 and 11, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. User Equipment (UE) comprising:
 a non-transitory computer-readable medium to store a mapping between Access Point Names (APNs), associated with a network, and applications associated with the UE; and
 processing circuitry to:
  determine a barring status associated with the APNs, the barring status indicating whether communications associated with one or more of the APNs should be barred by the UE, the determination of the barring status including:
   receiving an indication, from the network, indicating the barring status of one or more of the APNs; and
  block a transmission of application requests to the network, from a particular application associated with the UE, when a barring status of the APN associated with the particular application indicates that communications should be barred and wherein the application requests are requests to initiate data sessions via the network.

2. The UE of claim 1, wherein the mappings are stored as application categories that are associated with APNs.

3. The UE of claim 1, wherein determining the barring status further includes receiving the barring status as a probability value or time period over which barring for a particular APN is to remain active.

4. The UE of claim 1, wherein the processing circuitry is further to:
determine whether APN barring has been activated by the network; and
wherein blocking the transmission of the application requests is performed only when APN barring has been activated by the network.

5. The UE of claim 1, wherein, when determining the barring status associated with the APNs, the processing circuitry is further to:
receive, from the network, an enumeration of APNs that have a barring status indicating that communications associated with any of the APNs in the enumeration should be barred by the UE.

6. The UE of claim 5, wherein the enumeration of APNs is received as part of a System Information Block Type 2 message or a dedicated message.

7. The UE of claim 1, wherein, when determining the barring status associated with the APNs, the processing circuitry is further to:
receive, from the network, an enumeration of APNs that have a barring status indicating that communications associated with any APN that is not in the enumeration should be barred by the UE.

8. The UE of claim 7, wherein the enumeration of APNs is received as part of a System Information Block Type 2 message or a dedicated message.

9. The UE of claim 1, wherein, when determining the barring status associated with the APNs, the processing circuitry is further to:
receive, from the network, an indication of the barring status, for a particular APN, in conjunction with establishment of a default or dedicated Evolved Packet System (EPS) bearer for the APN.

10. The UE of claim 1, wherein, when determining the barring status associated with the APNs, the processing circuitry is further to:
receive, from the network, an indication of the barring status, for a particular APN, as a priority value associated with the particular APN,
wherein blocking the transmission of application requests to the network is based on a comparison of the priority associated with the particular APN to a priority value allowed by the network.

11. The UE of claim 1, wherein, when determining the barring status associated with the APNs, the processing circuitry is further to:
receive, from the network, an indication of the barring status, for a particular APN, as an enumeration of levels of acceptable congestion for the APN,
wherein blocking the transmission of application requests to the network is based on a comparison of the enumeration of the levels of acceptable congestion for the APN with an indication of a current congestion level of the network.

12. A method comprising:
storing, by User Equipment (UE), a mapping between Access Point Names (APNs), associated with a network, and applications associated with the UE;
determining, by the UE, a barring status associated with the APNs, the barring status indicating whether communications associated with one or more of the APNs should be barred by the UE, the determination of the barring status including:
receiving an indication, from the network, indicating the barring status of one or more of the APNs; and
refraining, by the UE, from transmitting requests to the network, from a particular application associated with the UE, when a current barring status of the APN associated with the particular application indicates that communications should be barred,
wherein the transmitted requests are requests to initiate data sessions via the network.

13. The method of claim 12, wherein the determining of the barring status associated with the APNs further includes:
receiving, from the network, an enumeration of APNs that have a barring status indicating that communications associated with any of the APNs in the enumeration should be barred by the UE.

14. The method of claim 12, wherein the determining of the barring status associated with the APNs further includes:
receiving, from the network, an enumeration of APNs that have a barring status indicating that communications associated with any APN that is not in the enumeration should be barred by the UE.

15. The method of claim 12, wherein the determining of the barring status associated with the APNs further includes:
receiving, from the network, an indication of the barring status, for a particular APN, during establishment of a default or dedicated Evolved Packet System (EPS) bearer for the APN.

16. The method of claim 12, wherein the determining of the barring status associated with the APNs further includes:
receiving, from the network, an indication of the barring status, for a particular APN, as a priority value associated with the particular APN,
wherein blocking the transmission of requests to the network is based on a comparison of the priority associated with the particular APN with to an indication of a priority value allowed by the network.

17. The method of claim 12, wherein the determining of the barring status associated with the APNs further includes:
receiving, from the network, an indication of the barring status, for a particular APN, as an enumeration of levels of acceptable congestion for the APN,
wherein blocking the transmission of application requests to the network is based on a comparison of the enumeration of the levels of acceptable congestion for the APN with an indication of a current congestion level of the network.

18. User Equipment (UE) comprising:
a non-transitory computer-readable medium to store a mapping between Evolved Packet System (EPS) bearer connections, associated with a network, and applications associated with the UE; and
processing circuitry to:
determine an EPS bearer barring status associated with the EPS bearer connections, the EPS bearer barring status indicating whether communications associated with one or more of the EPS bearer connections should be barred by the UE;

receive an indication, from the network, of whether EPS bearer barring should be active; and block communications, requested by a particular application associated with the UE, when an EPS bearer barring status of the EPS bearer connection associated with the particular application indicates that communications should be barred and when EPS bearer barring was indicated as being active for the network.

19. The UE of claim 18, wherein the EPS bearer connections are represented by a bearer identity value.

20. The UE of claim 18, wherein determining the EPS bearer barring status further includes:

receiving the EPS bearer barring status as part of an initial configuration of the EPS bearer connections.

21. The UE of claim 18, wherein determining the EPS bearer barring status further includes:

receiving the EPS bearer barring status, for a particular EPS bearer connection, as a priority value associated with the particular EPS bearer connection, wherein blocking the communications by the particular application is based on a comparison of the priority associated with the particular EPS bearer to a priority value allowed by the network.

22. The UE of claim 18, wherein determining the EPS bearer barring status further includes:

receiving the EPS bearer barring status, for a particular EPS bearer connection, as an enumeration of levels of acceptable congestion for the EPS bearer connection, wherein blocking the communications by the particular application is based on a comparison of the enumeration of the levels of acceptable congestion for the EPS bearer connection with an indication of a current congestion level of the network.

23. The UE of claim 18, wherein determining the EPS bearer barring status further includes:

receiving the EPS bearer barring status as information included in a dedicated network message that is received during initial configuration of an EPS bearer.

24. The UE of claim 18, wherein determining the EPS bearer barring status further includes:

receiving the EPS bearer barring status as a bitmap value in which each bit in the bitmap value corresponds to a particular bearer connection.

* * * * *